United States Patent
Nakajima et al.

(10) Patent No.: US 7,738,787 B2
(45) Date of Patent: Jun. 15, 2010

(54) OPTICAL TRANSMISSION LINE MONITORING DEVICE, OPTICAL TRANSMISSION LINE MONITORING METHOD, AND COMPUTER PROGRAM

(75) Inventors: Toshiaki Nakajima, Chiba-ken (JP); Kenji Yasuhara, Chiba-ken (JP)

(73) Assignee: Fujikura Ltd., Tokyo (JP)

( * ) Notice: Subject to any disclaimer, the term of this patent is extended or adjusted under 35 U.S.C. 154(b) by 508 days.

(21) Appl. No.: 11/779,774

(22) Filed: Jul. 18, 2007

(65) Prior Publication Data

US 2008/0085114 A1 Apr. 10, 2008

(30) Foreign Application Priority Data

Jul. 18, 2006 (JP) .............................. 2006-195794

(51) Int. Cl.
  H04B 10/08 (2006.01)
  H04B 10/00 (2006.01)
(52) U.S. Cl. .............................. 398/33; 398/25; 398/158
(58) Field of Classification Search .................. 398/9, 398/25–27, 33, 158, 162
  See application file for complete search history.

(56) References Cited

U.S. PATENT DOCUMENTS

| 7,260,324 | B2 * | 8/2007 | Passier et al. ................. 398/17 |
| 2003/0099014 | A1 * | 5/2003 | Egner et al. ................. 359/124 |
| 2004/0004709 | A1 * | 1/2004 | Pitchforth, Jr. ............. 356/73.1 |

FOREIGN PATENT DOCUMENTS

| JP | 02-132338 A | 5/1990 |
| JP | 2674659 B2 | 7/1997 |

* cited by examiner

*Primary Examiner*—Dalzid Singh
(74) *Attorney, Agent, or Firm*—Sughrue Mion, PLLC

(57) ABSTRACT

An optical transmission line monitoring device is provided including a device which calculates a management amount based on an optical intensity of returning light, a reference data storage device which stores reference management amounts beforehand, a detecting device which in response to the calculated management amount being of poorer quality than the reference management amount stored in the reference data storage device detects a distance, creates detection data based on the calculated management amount, and stores the created detection data in a detection data storage device, an alarm outputting device that creates alarm data based on the detection data created by the detecting device, and displays the created alarm data on a screen, an inputting device that inputs selection command data indicating that the alarm data displayed on the screen will not be output, and a removal data adding device that adds, to the detection data stored in the detection data storage device corresponding to the alarm data of the selection command data input by the inputting device, output removal data indicating that it is not a target for outputting by the alarm outputting device; wherein the alarm outputting device changes a display of the alarm data corresponding to the detection data that the removal data adding device adds the output removal data to.

22 Claims, 33 Drawing Sheets

FIG. 2

DATA CONFIGURATION OF REFERENCE DATA STORAGE UNIT

| TYPE | LOSS (dB) | RREFLECTION ATTENUATION AMOUNT (dB) |
|---|---|---|
| REFERENCE LOSS AMOUNT | 1.0 | |
| REDETECTION REFERENCE LOSS AMOUNT | 0.5 | |
| REFERENCE REFLECTION ATTENUATION AMOUNT | | 10.0 |
| REDETECTION REFLECTION ATTENUATION AMOUNT | | -1.0 |
| DTERMINATION REFERENCE CONFIGURATION AMOUNT | 8 | 19.0 |

FIG. 3

DATA CONFIGURATION OF DETECTION DATA STORAGE UNIT

| OCCURRENCE TIME | STATUS | LINE DATA | TYPE | DISTANCE | VALUE | Ack | MESSAGE |
|---|---|---|---|---|---|---|---|
| 8/22 9:03 | OCCURRED | G1 U1 Port3 | TERMINATION | 7.325km | 2.3dB | DONE | XXXXXXXXXXXXXXXXXXXXX |
| 8/23 2:14 | RECOVERED | G2 U5 Port3 | REFLECTION | 2.004km | 14dB | DONE | XXXXXXXXXXXXXXXXXXXXX |
| 8/23 5:05 | OCCURRED | G1 U8 Port3 | LOSS | 6.984km | 2.1dB | NOT YET | XXXXXXXXXXXXXXXXXXXXX |
| 8/23 7:12 | OCCURRED | G1 U10 Port3 | LOSS | 5.000km | 3.3dB | NOT YET | XXXXXXXXXXXXXXXXXXXXX |

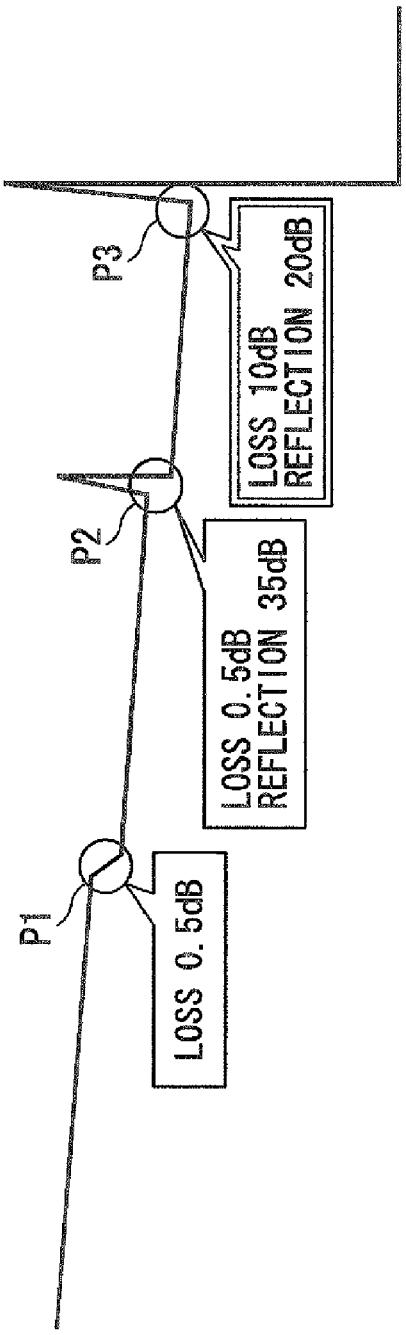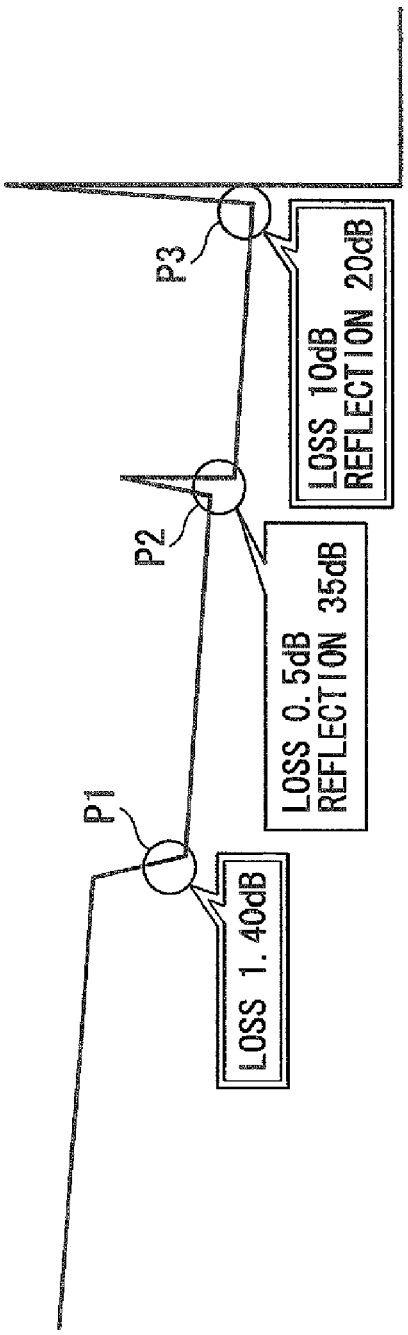

OPTICAL TRANSMISSION LINE MONITORING DEVICE, OPTICAL TRANSMISSION LINE MONITORING METHOD, AND COMPUTER PROGRAM

CROSS-REFERENCE TO RELATED PATENT APPLICATIONS

This application claims priority from Japanese Patent Application No. 2006-195794, filed on Jul. 18, 2006, the disclosure of which is incorporated herein by reference.

BACKGROUND OF THE INVENTION

1. Field of the Invention

Apparatuses and methods consistent with the present invention relate to an optical transmission line monitoring device used in a monitoring device on an optical transmission line, an optical transmission line monitoring method, and a computer program.

2. Description of Related Art

Conventionally, a communication device installed at a communication station and a plurality of terminating devices installed in users' homes are connected by optical fiber cables (hereinafter 'optical fibers') in a star-type interconnection or the like to construct an optical transmission line.

To monitor such an optical transmission line after it is constructed, for example, an optical pulse is introduced along the longitudinal direction of the optical fiber of the transmission line using optical time domain reflectometers (OTDRs), and a measurement is token of returning light based on reflection from devices and Rayleigh scattering generated by the incidence. The measurement is contrasted with device information created at the time of design based on construction design plans, and stored as initial measurement data. Device data includes data relating to terminating devices constituting a device on the optical transmission line, optical fiber fusion points, types of connection devices such as connectors for connecting the optical fibers, and information relating to positions and names of these pieces of the device.

By storing the device data and the initial measurement data as described above, measurement data of the next monitoring process can be contrasted with the initial measurement data, and, when a failure is detected, the location and status of the failure can be identified by referring to device data arranged in correlation with the initial measurement data (e.g. see Japanese Patent No. 2674659).

However, to pre-register device data and initial measurement data is problematic in that taking one measurement using OTDR or the like and correlating this measurement with the device data requires a long time, and is burdensome in regard to cost.

Furthermore, on an optical transmission line whose line status is frequently changed, the device data and the initial measurement data must be changed every time, resulting in a problem that a next monitoring process cannot be performed until these changes are completed.

SUMMARY OF THE INVENTION

The present invention has been realized to solve the problems mentioned above, and aims to provide an optical transmission line monitoring device that can monitor an optical transmission line without pre-registration of device data and initial measurement data, an optical transmission line monitoring method, and a computer program.

To solve the above problems, the invention provides an optical transmission line monitoring device comprising a device that is connected to a measuring device that introduces an optical pulse along a longitudinal direction of an optical fiber constituting an optical transmission line, and measures the optical intensity of returning light obtained by the incidence and a distance based on a time when the returning light is received, the device calculating a management amount by performing an analysis of the optical intensity obtained from the measuring device; a reference data storage device that stores reference management amounts beforehand; a detecting device that detects a distance when the calculated management amount is of poorer quality than the reference management amount stored in the reference data storage device, creates detection data containing the management amount at the time of detection, and stores the created detection data in a detection data storage device; and an alarm outputting device that creates alarm data based on the detection data created by the detecting device, and displays the created alarm data on a screen; an inputting device that, when manipulated by a user, inputs selection command data that indicates that the alarm data displayed on the screen is selected as alarm data that will not be output; and a removal data adding device that adds, to the detection data stored in the detection data storage device corresponding to the alarm data of the selection command data input by the inputting device, output removal data indicating that it is not a target for outputting by the alarm outputting device. The alarm outputting device displays alarm data displayed on the screen, corresponding to the detection data that the removal data adding device adds the output removal data to, such that it can be distinguished from other alarm data.

In the above invention, the reference data storage device stores a termination reference management amount that becomes a condition for detecting a termination of the optical transmission line; the detecting device detects the distance when the management amount is of poorer quality than the termination reference management amount stored in the reference data storage device, creates termination detection data containing the detected distance and the management amount, and stores the created termination detection data in the detection data storage device; and the alarm outputting device creates, based on the termination detection data created by the detecting device, alarm data containing data indicating that it is a candidate for termination, and displays the created alarm data on the screen.

In the above invention, the inputting device, manipulated by the user, inputs selection command data indicating that the alarm data containing data indicating that it is a candidate for termination displayed on the screen is selected as a termination; the removal data adding device adds output removal data to the detection data stored in the detection data storage device corresponding to the alarm data of the selection command data indicating that it is selected as a termination, input by the inputting device; and, with respect to detection data of the termination that the output removal data was added to by the removal data adding device, when alarm data corresponding to that detection data is being displayed on the screen, the alarm outputting device deletes the display of the alarm data.

The above invention further comprises a notifying device that notifies a warning. The alarm outputting device displays the alarm data on the screen, and notifies the alarm to the detecting device; and, with respect to the detection data that the output removal data was added to by the removal data adding device, displays alarm data being displayed on the screen corresponding to that detection data such that it can be distinguished from other alarm data, and makes the notifying device stop notification of the alarm; or, with respect to the detection data of the termination that the output removal data was added to by the removal data adding device, when alarm data corresponding to that detection data is being displayed on the screen, deletes display of the alarm data, and makes the notifying device stop notification of the alarm.

In the above invention, the reference data storage device stores a redetection reference management amount that becomes a condition when redisplaying the alarm data; the detecting device, when the detection data corresponding to the detected distance exists in the detection data storage device and the output removal data has been added to the detection data, calculates a difference between a management amount corresponding to the detected distance and the management amount contained in the detection data, and, when the calculated difference is of poorer quality than the redetection reference management amount, stores the detected management amount in the detection data, and deletes the output removal data; and the alarm outputting device creates alarm data corresponding to the detection data from which the detecting device deleted the output removal data, and displays the created alarm data on the screen.

In the above invention, the management amount is a loss amount; the reference data storage device stores a reference loss amount as the reference management amount; and the detecting device detects the distance when the loss amount exceeds the reference loss amount stored in the reference data storage device, creates detection data containing the loss amount and the distance at the time of detection, and stores the created detection data in the detection data storage device.

In the above invention, the management amount is a reflection attenuation amount; the reference data storage device stores a reference reflection attenuation amount as the reference management amount; and the detecting device detects the distance when the reflection attenuation amount is below the reference reflection attenuation amount stored in the reference data storage device, creates detection data containing the reflection attenuation amount and the distance at the time of detection, and stores the created detection data in the detection data storage device.

In the above invention, the management amount is a loss amount or a reflection attenuation amount; the reference data storage device stores a termination reference loss amount or a termination reference reflection attenuation amount as the termination reference management amount; and the detecting device detects the distance when the loss amount exceeds the termination reference loss amount stored in the reference data storage device, and when the reflection attenuation amount is below the termination reference reflection attenuation amount stored in the reference data storage device, creates termination detection data containing the detected distance and the loss amount, or the reflection attenuation amount, and stores the created detection data in the detection data storage device.

The above invention includes a first connecting device connected to a device data managing device that stores device data of the optical transmission line in an internal storage region, and a device data display device that receives the device data from the device data managing device via the first connecting device, and, based on the detection data stored in the detection data storage unit and the received device data, extracts, from the device data, device data corresponding to the detection data, and displays it on a screen.

The above invention includes a second connecting device connected to a map data managing device that receives input of positional data, and outputs map data displaying superimposed data indicating a location corresponding to the positional data; a positional data storage device that stores positional data corresponding to the distance of each detection data on the optical transmission line; and a positional data display device that reads positional data corresponding to a distance contained in the alarm data from the positional data storage device, transmits the read positional data via the second connecting device to the map data managing device, receives map data displaying superimposed data indicating a location corresponding to the positional data from the map data managing device, and displays the received map data on a screen.

Another aspect of the invention provides an optical transmission line monitoring method in an optical transmission line monitoring device comprising a device that is connected to a measuring device that introduces an optical pulse along a longitudinal direction of an optical fiber constituting an optical transmission line, and measures the optical intensity of returning light obtained by the incidence and a distance based on a time when the returning light is received, the device calculating a management amount by performing an analysis of the optical intensity obtained from the measuring device; a reference data storage device that stores reference management amounts beforehand; a detecting device that detects a distance when the calculated management amount is of poorer quality than the reference management amount stored in the reference data storage device, creates detection data containing the management amount at the time of detection, and stores the created detection data in a detection data storage device; and an alarm outputting device that creates alarm data based on the detection data created by the detecting device, and displays the created alarm data on a screen. The method includes a step of receiving a manipulation by a user, and inputting selection command data that indicates that the alarm data displayed on the screen is selected as alarm data that will not be output, a step of adding, to the detection data stored in the detection data storage device corresponding to the alarm data of the input selection command data, output removal data indicating that it is not a target for outputting by the alarm outputting device, and a step of making the alarm outputting device display alarm data displayed on the screen, corresponding to the detection data that the output removal data is added to, such that it can be distinguished from other alarm data.

Another aspect of the invention provides a computer program for a computer installed in an optical transmission line monitoring device comprising a device that is connected to a measuring device that introduces an optical pulse along a longitudinal direction of an optical fiber constituting an optical transmission line, and measures the optical intensity of returning light obtained by the incidence and a distance based on a time when the returning light is received, the device calculating a management amount by performing an analysis of the optical intensity obtained from the measuring device; a reference data storage device that stores reference management amounts beforehand; a detecting device that detects a distance when the calculated management amount is of poorer quality than the reference management amount stored in the reference data storage device, creates detection data containing the management amount at the time of detection, and stores the created detection data in a detection data storage device; and an alarm outputting device that creates alarm data based on the detection data created by the detecting device, and displays the created alarm data on a screen. The computer program makes the computer execute a step of receiving a manipulation by a user, and inputting selection command data that indicates that the alarm data displayed on the screen is selected as alarm data that will not be output; a step of adding, to the detection data stored in the detection data storage device corresponding to the alarm data of the input selection command data, output removal data indicating that it is not a target for outputting by the alarm outputting device; and a step of making the alarm outputting device display alarm data displayed on the screen, corresponding to the detection data that the output removal data is added to, such that it can be distinguished from other alarm data.

Furthermore, to solve the above problems, the invention provides an optical transmission line monitoring device that is connected to a measuring device that introduces an optical pulse along a longitudinal direction of an optical fiber constituting a PON system optical transmission line, and measures the optical intensity of returning light obtained by the incidence and a distance based on a time when the returning light is received, the device comprising a waveform display device that receives data correlating the optical intensity of the returning light and the distance from the measuring device, and displays a waveform based on the received optical intensity and the distance; a peak detecting device that detects a peak in the waveform displayed by the waveform display device, creates detection data based on data relating to the detected waveform peak, and stores the created detection data in a detection data storage device; an alarm outputting device that creates display data based on the detection data stored in the detection data storage device, and outputs the created display data as an alarm to a screen; an inputting device that, when manipulated by a user, inputs selection command data that indicates that the display data displayed on the screen is selected as display data that will not be output as an alarm; and a removal data adding device that adds, to the detection data identified by the selection command data input by the inputting device, output removal data indicating that it is detection data that is not a target for outputting as an alarm. The alarm outputting device does not display the display data, corresponding to the detection data that the removal data adding device adds the output removal data to, as an alarm.

The invention also includes coordinate data an inputting device that, manipulated by a user, inputs coordinate data specifying a region in a screen displayed by the waveform display device; the peak detecting device includes a frame display device that displays on the screen a frame in a region based on the coordinate data input by the coordinate data inputting device, and a detection processing device that, in the waveform contained in the frame displayed by the frame display device, detects a peak of the waveform, creates detection data based on data relating to the detected peak of the waveform, and stores the created detection data in a detection data storage device.

In the above invention, the detection data created by the peak detecting device includes a reflection attenuation amount at the peak; when the peak detecting device newly creates detection data corresponding to the peak, if the peak detecting device detects, using as a reference a reflection attenuation amount of the detection data of the peak that the output removal data stored in the detection data storage device was added to, that the reflection attenuation amount contained in the newly created detection data has increased, it deletes the output removal data of the detection data whose reflection attenuation amount has increased; and the alarm outputting device outputs display data, corresponding to the detection data from which the output removal data was deleted by the peak detecting device, as an alarm.

In the above invention, the alarm outputting device, based on detection data created by the peak detecting device, creates display data containing data indicating a number of peaks, outputs the created display data to a screen, and, when the peak detecting device creates new detection data, and, if the number of peaks based on the newly detected detection data decreases, using as a reference the data indicating the number of the peaks contained in the display data, the alarm outputting device creates new display data containing the number of peaks, and outputs the created display data to the screen.

In the above invention, when the peak detecting device newly creates detection data, if the newly created detection data and detection data stored in the detection data storage device do not correspond at a distance, the alarm outputting device outputs the newly created detection data that does not correspond to the detection data stored in the detection data storage device, together with data indicating that it is detection data of the newly added device.

The above invention includes a first connecting device connected to a device data managing device that stores device data of the PON transmission line in an internal storage region; and a device data display device that receives the device data from the device data managing device via the first connecting device, and, based on the detection data stored in the detection data storage unit and the received device data, extracts, from the device data, device data corresponding to the detection data, and displays it on a screen.

In another aspect, the invention provides an optical transmission line monitoring method in an optical transmission line monitoring device that is connected to a measuring device that introduces an optical pulse along a longitudinal direction of an optical fiber constituting a PON system optical transmission line, and measures the optical intensity of returning light obtained by the incidence and a distance based on a time when the returning light is received. The method includes a step of receiving data correlating the optical intensity of the returning light and the distance from the measuring device; a step of displaying a waveform based on the received optical intensity and the distance; a step of detecting a peak in the displayed waveform; a step of creating detection data based on data relating to the detected waveform peak; a step of storing the created detection data in a detection data storage device; a step of creating display data based on the detection data stored in the detection data storage device; a step of outputting the created display data as an alarm to a screen; a step of receiving a manipulation by a user, and inputting selection command data that indicates that the display data displayed on the screen is selected as display data that will not be output as an alarm; a step of adding, to the detection data identified by the input selection command data, output removal data indicating that it is detection data that is not a target for outputting as an alarm, and storing it in the detection data storage device; and a step of not displaying display data, corresponding to the detection data that the output removal data is added to, as an alarm.

Another aspect of the invention provides a computer program for a computer of an optical transmission line monitoring device that is connected to a measuring device that introduces an optical pulse along a longitudinal direction of an optical fiber constituting a PON system optical transmission line, and measures the optical intensity of returning light obtained by the incidence and a distance based on a time when the returning light is received. The computer program makes the computer execute a step of receiving data correlating the optical intensity of the returning light and the distance from the measuring device; a step of displaying a waveform based on the received optical intensity and the distance; a step of detecting a peak in the displayed waveform; a step of creating detection data based on data relating to the detected waveform peak; a step of storing the created detection data in a detection data storage device; a step of creating display data based on the detection data stored in the detection data storage device; a step of outputting the created display data as an alarm to a screen; a step of receiving a manipulation by a user, and inputting selection command data that indicates that the display data displayed on the screen is selected as display data that will not be output as an alarm; a step of adding, to the detection data identified by the input selection command data, output removal data indicating that it is detection data that is not a target for outputting as an alarm, and storing it in the detection data storage device; and a step of not displaying display data, corresponding to the detection data that the output removal data is added to, as an alarm.

According to the invention, locations of irregularities in an optical transmission line can be detected based on a loss amount or a reflection attenuation amount obtained by analysis based on an optical pulse incident from a measuring device, and a preset reference value. Therefore, the optical transmission line can be monitored without pre-registering device data and initial measurement data.

BRIEF DESCRIPTION OF THE DRAWINGS

FIG. 2 is a diagram of a data configuration of a reference data storage unit in the first embodiment;

FIG. 3 is a diagram of a data configuration of a detection data storage unit in the first embodiment;

FIGS. 4A and 4B are explanatory diagrams of an alarm determination process in the first embodiment;

DETAILED DESCRIPTION OF THE INVENTION

Embodiments of the present invention will be explained with reference to the drawings.

First Embodiment

Figure 1:
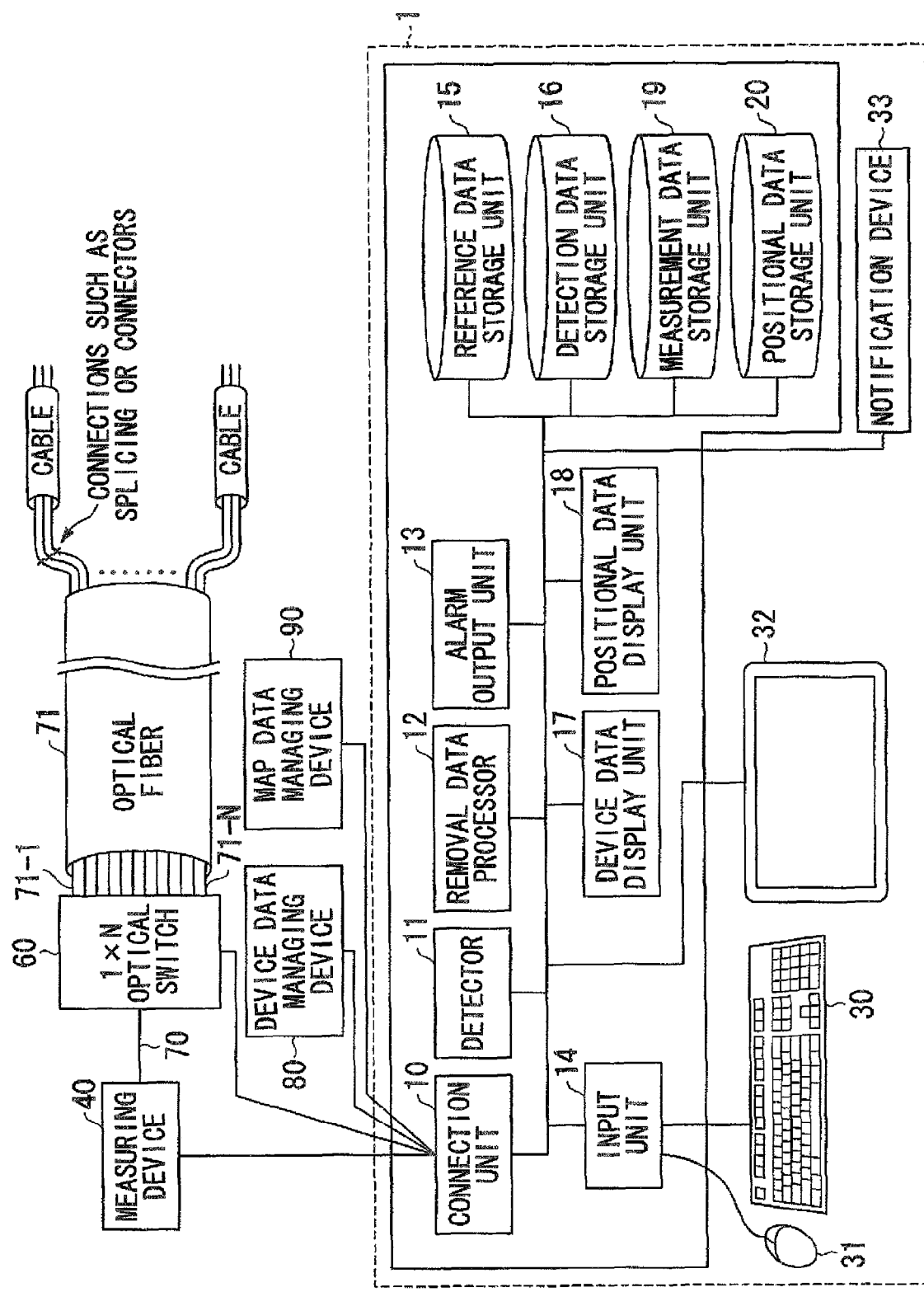
FIG. 1 is a block diagram of the relationship between an internal configuration of an optical transmission line monitoring device 1 according to a first embodiment, and devices connected to the monitoring device.

FIG. 1 is a general block diagram of the internal configuration of an optical transmission line monitoring device 1 according to a first embodiment, and an optical transmission line that is a target of monitoring by the optical transmission line monitoring device 1, a measuring device 40 that measures the optical intensity of the optical transmission line, a device data managing device 80 that stores device data relating to a device constituting the optical transmission line, and a map data managing device 90 that stores map data.

In FIG. 1, the optical transmission line is constructed as a star-type interconnection, and includes N optical fibers 71-1 to 71-N (described collectively as 'optical fibers 71'). Although there are un-terminated optical fibers as shown in FIG. 1 during construction and the like, when a communication service is actually provided, the optical fibers 71 are connected to terminating devices and the like installed in users' homes. Each of the optical fibers 71-1 to 71-N includes several optical fibers which are connected by connectors and the like, or spliced, until it reaches the termination.

Based on command data input from the optical transmission line monitoring device 1, an optical switch 60 connects any one of the N optical fibers 71 to an optical fiber 70 connected to the measuring device 40.

By utilizing, for example, an OTDR, the measuring device 40 introduces an optical pulse for testing to the optical fiber 70, and receives returning light that is returned by reflection from the optical transmission line. Returning light is light that is reflected from connector connection points, splicing points, and the like, and denotes rearward scattered light that is generated by Rayleigh scattering and the like specific to the optical fibers 71. The measuring device 40 measures the optical intensity of the received returning light, calculates the distance from an input terminal of the optical fiber 70 based on the time the light is received, and outputs the measured optical intensity and the calculated distance as measurement data.

In an optical transmission line on which a conventional communication service is provided, the measuring device 40 and a communication device that provides the communication service are connected as follows (not shown in FIG. 1). A wavelength-dependent directional coupler is connected to a connection termination of the optical fiber 70 that the measuring device 40 is connected to, two optical fibers are split to the device side from the directional coupler, the communication device is connected to one of these optical fibers and the measuring device 40 is connected to the other. An optical pulse for testing is then incident onto the optical fiber 70 from the measuring device 40 via the directional coupler. Since light-splitting characteristics of the directional coupler are dependent on the optical wavelength of the returning light, light of the optical pulse returning from the optical fiber 70 returns to the measuring device 40 and not to the communication device side. On the other hand, communication light of the communication device passes via the directional coupler and enters the optical fiber 70, from where reflected waves of communication light and the waves at the wavelength of communication data return via the directional coupler to the communication device, and do not return to the measuring device 40.

The device data managing device 80 stores beforehand device data of the device relating to the optical transmission line. Device data includes names given to the device (e.g. names of the device and names of connection points), design lengths of cables, types of connections (e.g. connectors, splicing). Device data is stored by an operation performed by a construction controller during construction, and by an operation performed by a user of the optical transmission line monitoring device 1 when writing new device data during monitoring.

The map data managing device 90 is a server device for providing map data that is, for example, connected to the internet, and, in reply to a transmission of requested data including positional information containing degrees of latitude and longitude, responds with map data within a fixed-distance range containing those degrees of latitude and longitude.

The optical transmission line monitoring device 1 uses a detecting unit 11 (explained below) to perform analysis based on the optical intensity of returning light measured by the measuring device 40, calculates an amount of loss or an amount of reflection attenuation, or executes controls such as outputting a warning (i.e. an alarm) based on the calculated amount of loss or amount of reflection attenuation.

In the optical transmission line monitoring device 1, a connection unit 10 is connected to the measuring device 40, the device data managing device 80, and the map data managing device 90. The connection unit 10 can be connected to a network and the like, and connected via this network to the measuring device 40, the device data managing device 80, and the map data managing device 90.

A reference data storage unit 15 stores reference values used when determining whether measurement data is a target for outputting an alarm, or when determining whether the measurement data corresponds to a termination of the optical transmission line, and has the data configuration shown in FIG. 2. In the reference data storage unit 15, a reference loss amount is a reference value used whoa a detecting unit 11 (explained below) determines whether a loss amount is a target for outputting an alarm. A redetection reference loss amount is a reference value used by the detecting unit 11 when the loss amount at a distance already output as an alarm increases, to determine whether the increase amount must be output again as an alarm.

A reference reflection attenuation amount is a reference value used by the detecting unit 11 to determine whether a reflection attenuation amount is a target for outputting an alarm. A redetection reference reflection attenuation amount is a reference value used by the detecting unit 11 when the reflection attenuation amount at a distance already output as an alarm decreases, to determine whether the decrease amount must be output again as an alarm. A terminal reference condition amount is a reference value including settings for loss amount and reflection attenuation amount, and is used by the detecting unit 11 to determine a termination of the optical transmission line. Incidentally, the loss amount and the reflection attenuation amount are each set in units of decibels (dB).

An input unit 14, connected to input devices such as a keyboard 30 and a mouse 31, detects a signal output by an input device that receives a command input from a user of the optical transmission line monitoring device 1 and inputs data corresponding to the detected signal.

An notification device 33 contains a sound source for an alarm, a speaker, a lamp, and the like. When the notification device 33 receives a start command, it generates an alarm from the speaker and makes the lamp flash; when it receives a stop command, it terminates the alarm and extinguishes the lamp.

The detecting unit 11 receives measurement data relating to the optical transmission line from the measuring device 40 via the connection unit 10, performs analysis based on the received measurement data, calculates the loss amount or the reflection attenuation amount of the optical transmission line, and records loss amount or the reflection attenuation amount together with the distance in a measurement data storage unit 19. When the calculated loss amount or reflection attenuation amount is of poorer quality than the reference loss amount and the reference reflection attenuation amount stored in the reference data storage unit 15, the detecting unit 11 stores detection data correlating the distance, the loss amount or the reflection attenuation amount, and data relating to the status at the time of occurrence such as date and time data, in a detection data storage unit 16; in addition, the detecting unit 11 notifies the alarm output unit 13 that a new piece of detection data has been stored.

In a case where output removal data (explained below) is added to detection data already stored in the detection data storage unit 16, when the detecting unit 11 receives new measurement data corresponding to the detection data, if the amount of change in the loss amount or the reflection attenuation amount is of poor quality than the redetection reference loss amount or the redetection reference reflection attenuation amount, the detecting unit 11 rewrites the loss amount or the reflection attenuation amount to a new value, and notifies the alarm output unit 13 that the detection data has been updated.

When the calculated loss amount or reflection attenuation amount is of poorer quality than the loss amount or reflection attenuation amount of the terminal reference condition stored in the reference data storage unit 15, the detecting unit 11 stores detection data including the distance, the loss amount or the reflection attenuation amount, data indicating that it is a candidate for termination, and data relating to the status at the time of occurrence such as date and time data, in the detection data storage unit 16.

The phrase 'of poorer quality' signifies, in regard to the loss amount, that the calculated loss amount exceeds the reference loss amount, and, in regard to the reflection attenuation amount, signifies that the calculated reflection attenuation amount falls below the reference reflection attenuation amount. In regard to the redetection reference loss amount, when the loss amount increases, it becomes a target for redetection when the difference in loss before and after the increase exceeds the redetection reference loss amount. In regard to the redetection reflection attenuation amount, when the reflection attenuation amount decreases, it becomes a target for redetection when the difference in reflection attenuation amount before and after the decrease falls below the redetection reference reflection attenuation amount.

When the alarm output unit 13 receives notification from the detecting unit 11 that a new piece of detection data has been stored, it creates alarm data based on the detection data stored in the detection data storage unit 16, and outputs the created alarm data to a screen 32; in addition, it transmits a start command to the notification device 33. At this time, if the detection data stored in the detection data storage unit 16 contains data indicating that it is a candidate for termination, the alarm output unit 13 creates alarm data containing data indicating that it is a candidate for termination, and outputs this to the screen 32.

Furthermore, when the alarm output unit 13 receives data from a exclusion data processing unit 12 (explained below) indicating that the detection data has been changed, in accordance with the change in the detection data stored in the detection data storage unit 16, the alarm output unit 13 deletes the alarm data displayed on the screen 32 or changes the display color, and terminates the alarm by transmitting a stop command to the notification device 33. When sending notification of a second alarm, it transmits a start command to the notification device 33.

When a user manipulates the keyboard 30 and the mouse 31 to select alarm data displayed on the screen 32, and makes a selection to exclude this alarm data as a target for output, the exclusion data processing unit 12 receives pieces of selection command data corresponding to each selection that is input to the input unit 14, retrieves detection data corresponding to the selection command data from the detection data storage unit 16, and stores output removal data indicating that this is excluded as a target for outputting an alarm in the retrieved detection data, i.e. it stores 'OK' in an 'Ack' entry of the detection data storage unit 16 (explained below).

When a user manipulates the keyboard 30 and the mouse 31 to select alarm data containing data indicating that it is a candidate for termination displayed on the screen 32, and makes a selection to exclude this alarm data as a target for output, the exclusion data processing unit 12 receives pieces of selection command data corresponding to each selection that is input to the input unit 14, retrieves detection data corresponding to the selection command data from the detection data storage unit 16, and stores 'OK' in the 'Ack' entry of the retrieved detection data. Also, when the exclusion data processing unit 12 stores 'OK' in the 'Ack' entry of the detection data, it notifies the alarm output unit 13 that the detection data has been changed.

The detecting unit 11 stores the detection data it detects in the detection data storage unit 16, which has the data configuration shown in FIG. 3. One record of detection data stored in the detection data storage unit 16 includes entries of 'Occurrence Time', 'Status', 'Line data', 'Type', 'Distance', 'Value', 'Ack', and 'Message'. Date and time data contained in the measurement data detected by the detecting unit 11 is stored in 'Occurrence Time'. In 'Status', 'Generated' is stored for detection data detected by the detecting unit 11 and output by the alarm output unit 13, and, while the alarm output unit 13 is outputting, 'Recovered' is stored when subsequently measured measurement data corresponding to that detection data satisfies the product quality. In 'Line data', when a plurality of measuring devices 40 are connected to the optical transmission line monitoring device 1, and when the measuring device 40 has a plurality of ports, previously-given identification data enabling each of these to be identified is stored. In 'Type', 'Loss' is stored for a loss amount, 'Reflection' is stored for a reflection attenuation amount, and 'Termination' is stored for a termination. In 'Distance', the distance from the input terminal of an optical fiber 70 corresponding to a loss amount or a reflection attenuation amount detected by the detecting unit 11 is stored. In 'Ack', for detection data that a user confirms to be not a target for output, output removal data indicating that it has been removed as a target for output (i.e. 'OK') is stored; for detection data that a user has not yet confirmed to be not a target for output, data indicating 'Not Yet' is stored. In 'Message', a message displayed when the alarm output unit 13 creates alarm data and outputs it to the screen 32 is stored. For example, in the case of an alarm, based on data for 'Type', 'Value', and 'Distance', a message that reads 'Level YYY of ZZZ dB detected at XXX km' is created while in the case of a termination, a message reading 'Termination detected at XXX km' is created.

An device data display unit 17 receives command data input from the input unit 14 when the user manipulates the keyboard 30 and the mouse 31, reads measurement data from the measurement data storage unit 19, and displays it on the screen 32. The device data display unit 17 receives, in the screen 32, command data input from the input unit 14 when the user manipulates the keyboard 30 and the mouse 31, and receives device data from the device data managing device 80. Based on the received device data and detection data corresponding to the measurement data displayed on the screen 32, the device data display unit 17 detects device data that is a target for generating an alarm, and outputs all the received device data to the screen 32 with the detected device data that is a target for generating an alarm in a recognizable format.

When measurement data displayed on the screen 32 by the device data display unit 17, or alarm data displayed on the screen by the alarm output unit 13, is selected by the user manipulating the keyboard 30 and the mouse 31, a positional data display unit 18 reads positional data including degrees of latitude and longitude corresponding to the distance contained in the selected data from a positional data storage unit 20, and transmits request data containing the positional data that it read to the map data managing device 90. The positional data display unit 18 also receives map data from the map data managing device 90, and displays the received map data on the screen 32.

The positional data storage unit 20 stores beforehand positional data containing degrees of latitude and longitude corresponding to distances of each line of the optical transmission line. The distances stored by the positional data storage unit 20 can be distances where the representative device is located, and positional data corresponding to those distances; alternatively, select positional data that is nearest a distance input from the positional data display unit 18 can be selected from among the stored distances, and replied to with positional data corresponding to the selected distance which is then output to the positional data display unit 18. When monitoring a plurality of optical transmission lines, data enabling each optical transmission line to be identified (e.g. positional data corresponding to a distance in each piece of identification data stored in 'Line data' of the detection data storage unit 16) can be stored, whereby the distance is input together with the identification data from the positional data display unit 18.

Next, an alarm determination process performed by the detecting unit 11 and the alarm output unit 13 will be explained with reference to FIGS. 4 and 5.

FIGS. 4A and 4B are waveform graphs of measurement data received via the connection unit 10, where the horizontal axis represents distance and the vertical axis represents the intensity of returning light. FIG. 4A is a normal waveform, and FIG. 4B, an irregular waveform. It is assumed here that the reference values shown in FIG. 2 are set in the reference data storage unit 15. The detecting unit 11 makes an analysis based on the measurement data, and calculates a loss amount or a reflection attenuation amount. Depending on the position, it is sometimes impossible to calculate the reflection attenuation amount, in which case only the loss amount is calculated. For the loss amount, the detecting unit 11 compares the calculated loss amount with the loss amount of the terminal reference condition amount stored in the reference data storage unit 15; for the reflection attenuation amount, it compares the calculated reflection attenuation amount with the loss amount of the terminal reference condition amount stored in the reference data storage unit 15. For a loss amount or a reflection attenuation amount that was not a candidate for termination, the detecting unit 11 compares the calculated loss amount with the reference loss amount stored in the reference data storage unit 15, or compares the calculated reflection attenuation amount with the reference reflection attenuation amount stored in the reference data storage unit 15.

In the regular waveform of FIG. 4A, since the loss amount of distance P3 exceeds the loss amount of the terminal reference condition amount, and the reflection attenuation amount is below the reflection attenuation amount of the terminal reference condition amount, it is detected as a candidate for termination. With regard to the comparison with the terminal reference condition amount, if one of the loss amount and the reflection attenuation amount satisfies the terminal reference condition amount, the distance is detected as a candidate for termination.

In the irregular waveform of FIG. 4B, after detecting the distance P3 as a candidate for termination, at distance P1, since the loss amount exceeds the reference loss amount, distance P1 is detected as a candidate for alarm.

The detecting unit 11 creates detection data containing the distance detected as a candidate for termination, or the distance detected as a candidate for alarm, and a loss amount or a reflection attenuation amount, and stores this detection data in the detection data storage unit 16. When the alarm output unit 13 receives data indicating that new detection data has been stored from the detecting unit 11, it retrieves the newly stored detection data from the detection data storage unit 16, creates alarm data based on the retrieved detection data, and outputs an alarm confirmation screen 100 such as that shown in FIG. 5 to the screen 32.

Figure 5:
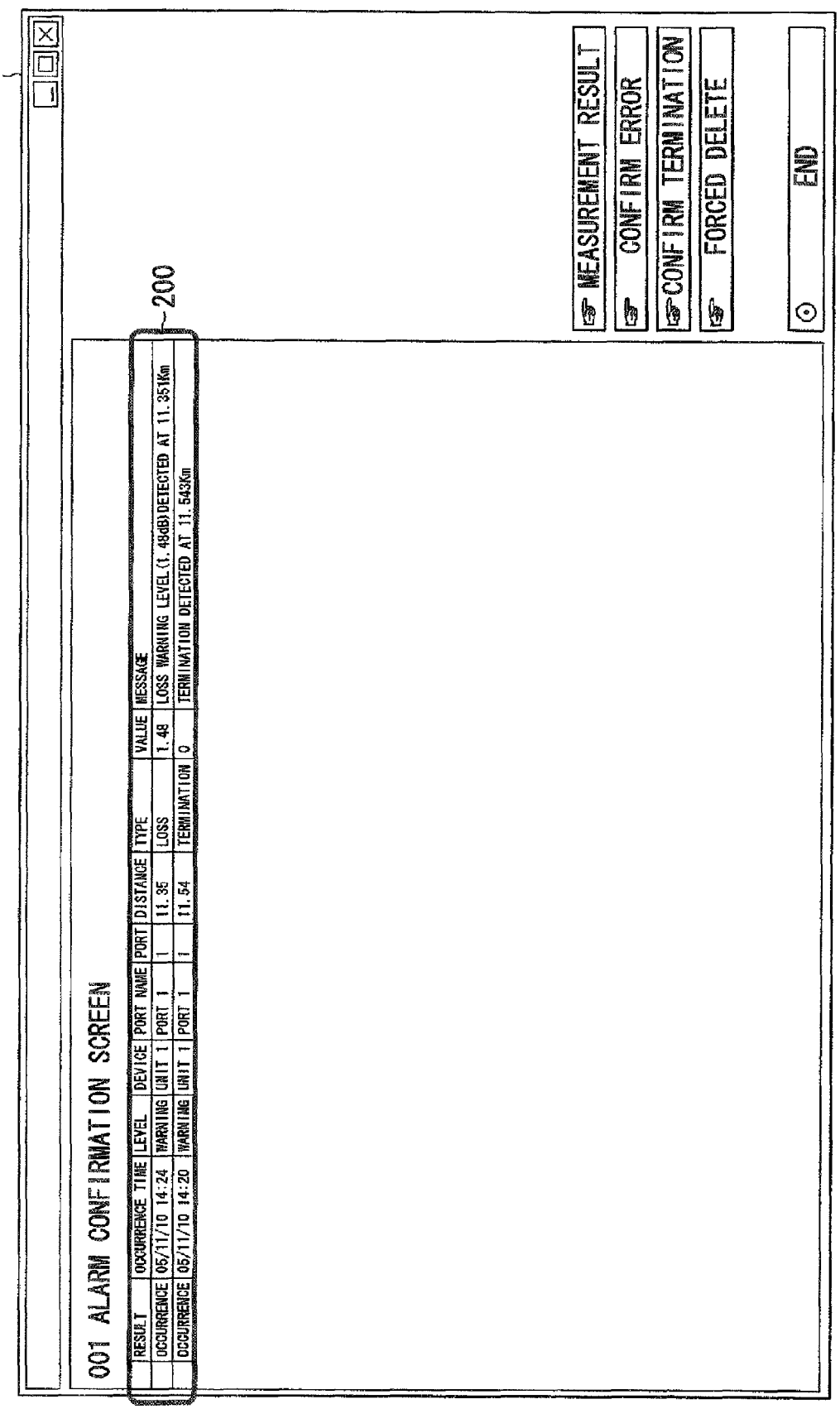
FIG. 5 is a diagram of an alarm confirmation screen (part 1) in the first embodiment.

In the alarm confirmation screen 100 of FIG. 5, two pieces of alarm data are displayed in a display area 200, the first being alarm data corresponding to distance P1, the second being alarm data corresponding to distance P3 and containing data indicating that it is a candidate for termination. The alarm confirmation screen 100 includes entries of 'Result', 'Occurrence Time', 'Level', 'Device', 'Port Name', 'Port', 'Distance', 'Type', 'Value', and 'Message'. In 'Result', data stored in the 'Status' entry of the detection data storage unit 16 is displayed. In 'Occurrence Time', data stored in the 'Occurrence Time' entry of the detection data storage unit 16 is displayed. In 'Level', data indicating levels of alarm such as warning, error, and data, is displayed, and indicates a level based on a threshold set beforehand for each loss amount or reflection attenuation amount. In 'Device', 'Port Name', and 'Port', data corresponding to 'Line Data' of the detection data storage unit 16 is displayed. The alarm output unit 13 makes the switch from 'Line Data' to 'Device', 'Port Name', and 'Port' by referring to data indicating the correlative relationship stored internally beforehand. In 'Type', data of 'Type' in the detection data storage unit 16 is displayed. In 'Value', data of 'Value' in the detection data storage unit 16 is displayed. In 'Message', data of 'Message' in the detection data storage unit 16 is displayed.

Figure 6:
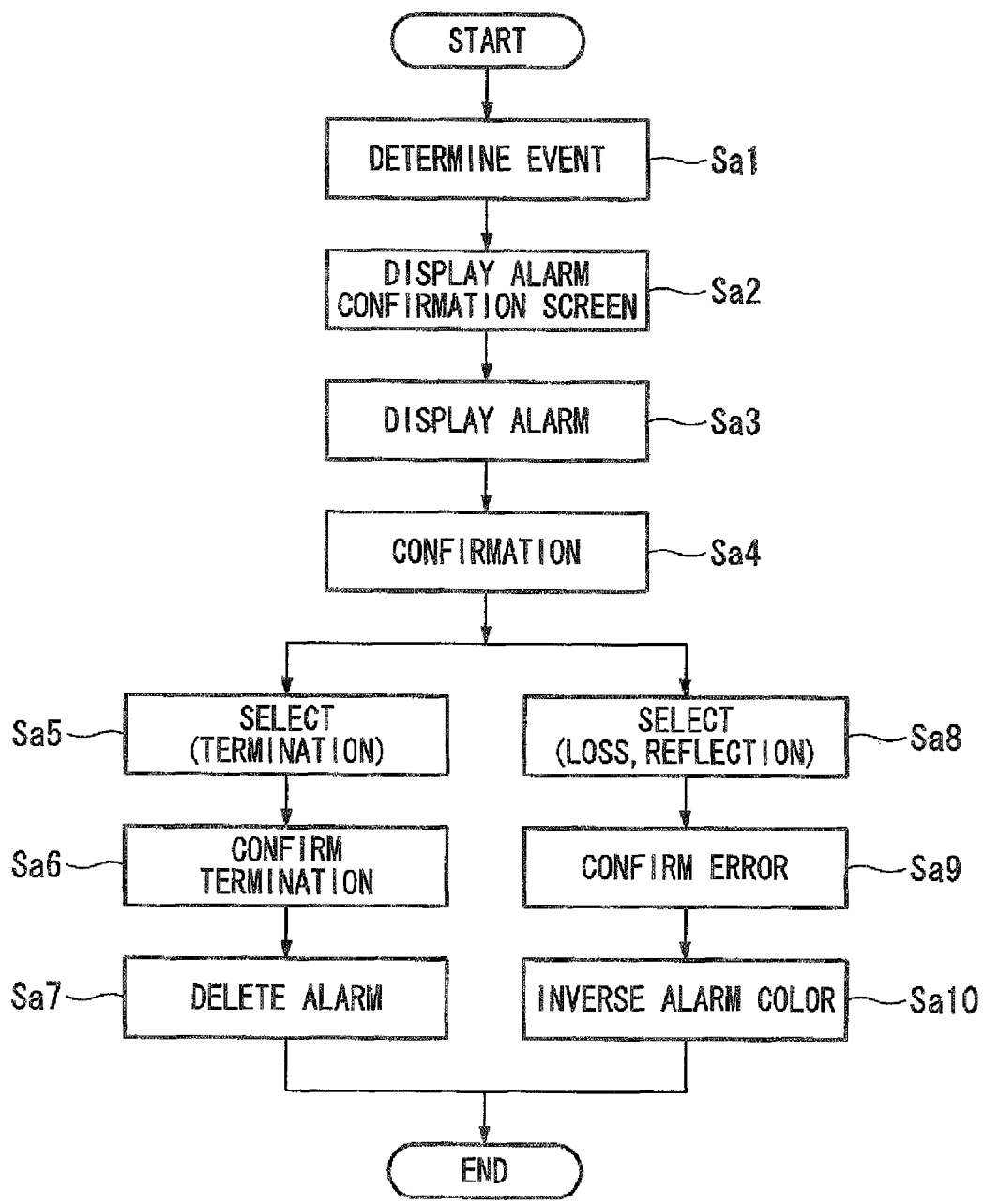
FIG. 6 is a diagram of the flow of processes of termination confirmation and error confirmation performed by a user in the first embodiment.

Next, an operation of the exclusion data processing unit 12 when an alarm confirmation command is received from a user will be explained with reference to FIGS. 6 to 12. FIG. 6 is a flowchart of the overall flow when a user makes an alarm confirmation command. In the following explanation, to differentiate between a termination and other alarms, alarms other than termination are termed errors.

Firstly, an operation when an alarm confirmation command is received from the user will be explained.

The input unit 14 that receives a command from the user starts an alarm detection process at the detecting unit 11 (step Sa1). The detecting unit 11 determines whether it is a termination or an error based on the measurement data, and stores detection data relating to termination or error in the detection data storage unit 16. When the detection data is stored in the detection data storage unit 16, the alarm output unit 13 displays the alarm confirmation screen 100 on the screen 32 (step Sa2). The alarm output unit 13 then displays alarm data created from the detection data on the alarm confirmation screen 100, and transmits a start command to the notification device 33 (step Sa3).

Figure 7:
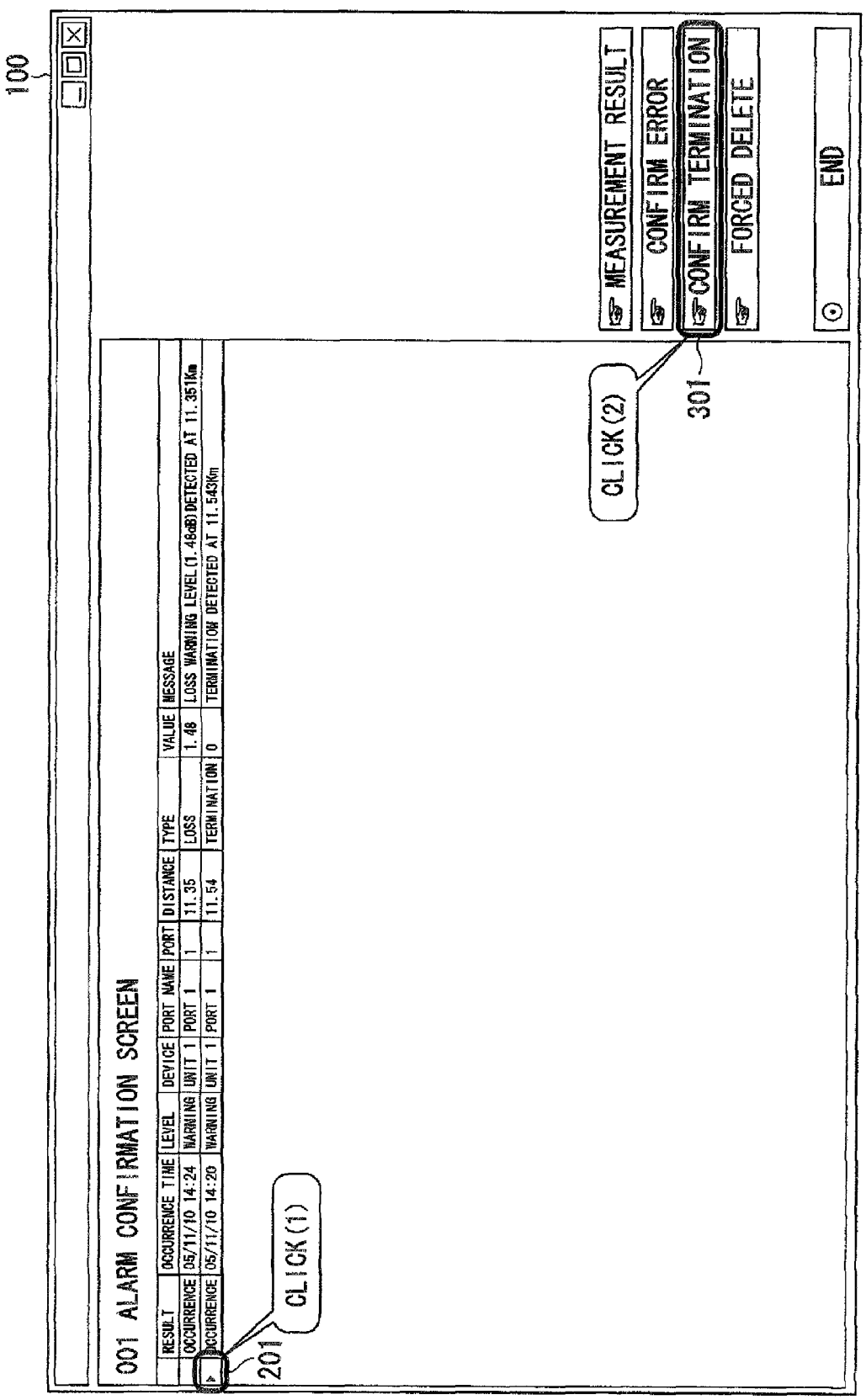
FIG. 7 is a diagram of an alarm confirmation screen (part 2) in the first embodiment.

FIG. 7 is a diagram of alarm data displayed on the alarm confirmation screen 100. While the alarm confirmation screen 100 is displayed on the screen 32, the user manipulates the mouse 31 to start an alarm confirmation operation (step Sa4).

When making a termination confirmation, the user manipulates the mouse 31 and selects data in the 'Type' entry of the alarm confirmation screen 100 displayed on the screen 32 indicating that it is a candidate for termination, i.e. the row where 'Termination' is displayed (reference numeral 201) (FIG. 7: click (1)). The input unit 14 receives this selection, and inputs selection command data to the exclusion data processing unit 12. The exclusion data processing unit 12 that inputs this selection command data stores the data of the selected row in an internal storage region (step Sa5).

Figure 8:
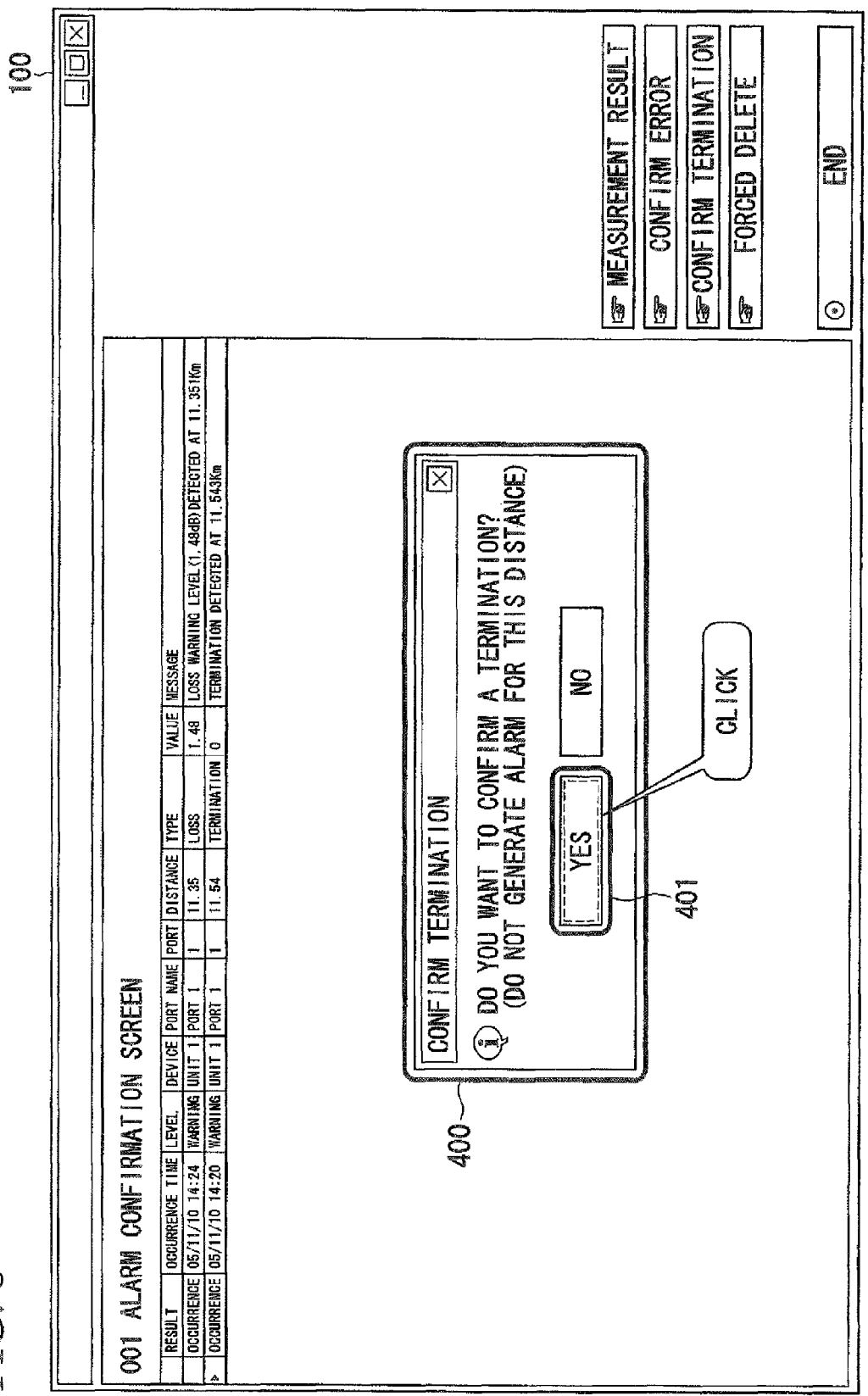
FIG. 8 is a diagram of an alarm confirmation screen (part 3) in the first embodiment.
Figure 9:
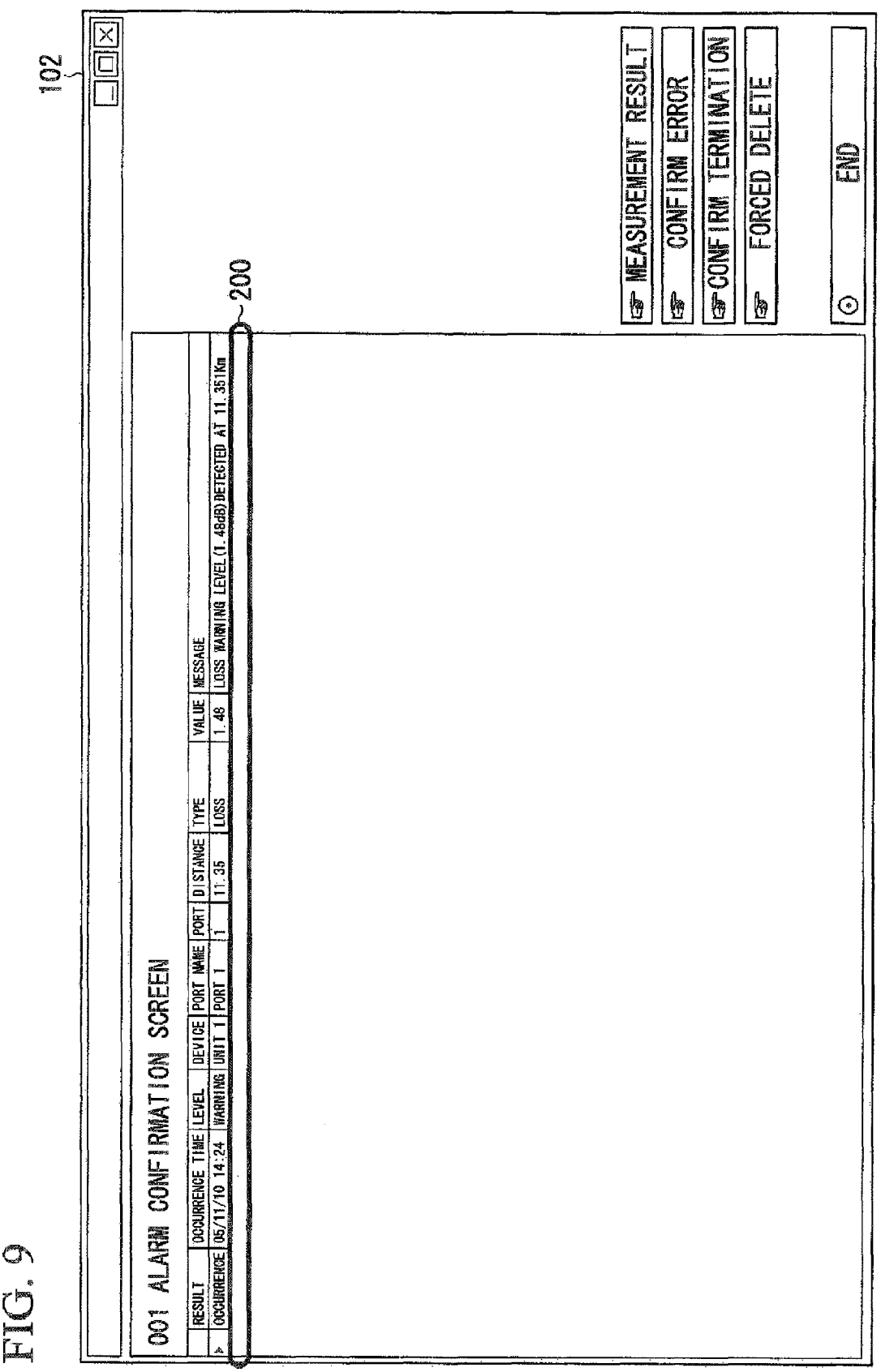
FIG. 9 is a diagram of an alarm confirmation screen (part 4) in the first embodiment.

While the row is selected, the user manipulates the mouse 31 and selects a button (reference numeral 301) for 'Termination Confirmation' in the alarm confirmation screen 100 displayed on the screen 32 (FIG. 7: click (2)). The input unit 14 receives this selection, and inputs terminal selection command data to the exclusion data processing unit 12. The exclusion data processing unit 12 that the termination selection command data is input to displays a small window (reference numeral 400) for 'Termination Confirmation' shown in FIG. 8. The user then manipulates the mouse 31, and, in the small window (reference numeral 400) for 'Termination Confirmation', selects a button for 'Yes' (reference numeral 401) (FIG. 8: click). Having received this selection command, the exclusion data processing unit 12 reads data of the selected row from an internal storage region, stores 'OK' in the 'Ack' column of detection data of the detection data storage unit 16 corresponding to the data of the read row, and notifies the alarm output unit 13 that the detection data has changed (step Sa6). The alarm output unit 13 retrieves the detection data stored in the detection data storage unit 16, and, when it detects that 'Type' has 'OK' stored in the 'Ack' record of 'Termination', deletes the alarm data that is a candidate for termination displayed in the alarm confirmation screen 100, and, when there is no other alarm data for notification, transmits a stop command to the notification device 33. The screen 32 thus displays an alarm confirmation screen 102 wherein the alarm data that was a candidate for termination has been deleted (step Sa7).

By this process, alarm data corresponding to termination is deleted from the screen, enabling the alarm to be stopped. Thereafter, even if the detecting unit 11 detects measurement data corresponding to termination, it becomes possible to display it as alarm data on the screen 32, and to prevent the notification device 33 from notifying it.

Figure 10:
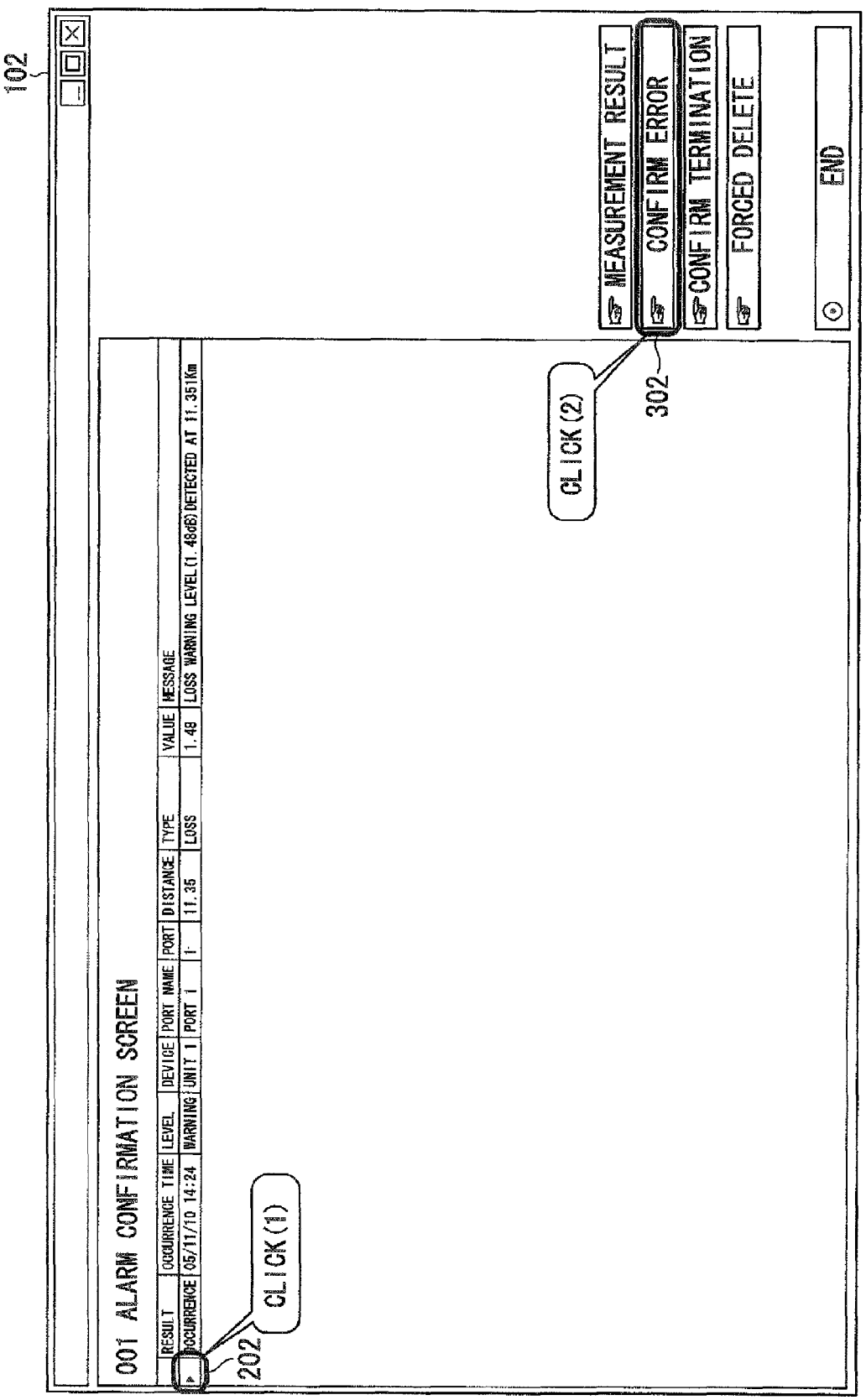
FIG. 10 is a diagram of an alarm confirmation screen (part 5) in the first embodiment.

Next, an operation when an error is confirmed will be explained. FIG. 10 is a diagram of an alarm confirmation screen 102 after a termination is contained. The user manipulates the mouse 31 and selects data indicating error in the 'Type' entry of the alarm confirmation screen 102 displayed on the screen 32, i.e. the row where data indicating 'Loss' or 'Reflection' is displayed (reference: numeral 202) (FIG. 10: click (1)). The input unit 14 that receives this selection inputs selection command data to the exclusion data processing unit 12. The exclusion data processing unit 12 that receives this selection command data stores the data of the selected row in an internal storage region (step Sa8).

Figure 11:
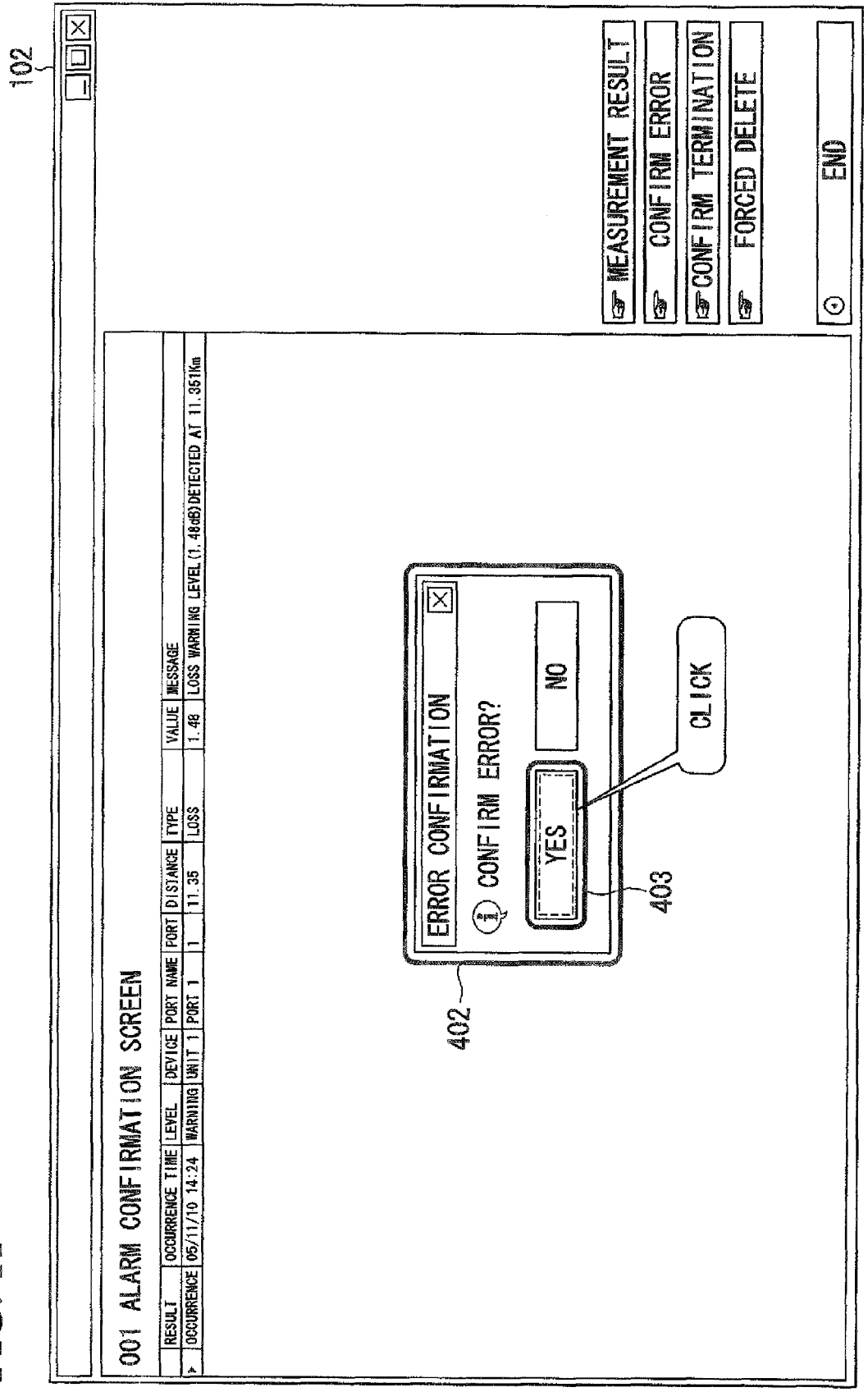
FIG. 11 is a diagram of an alarm confirmation screen (part 6) in the first embodiment.
Figure 12:
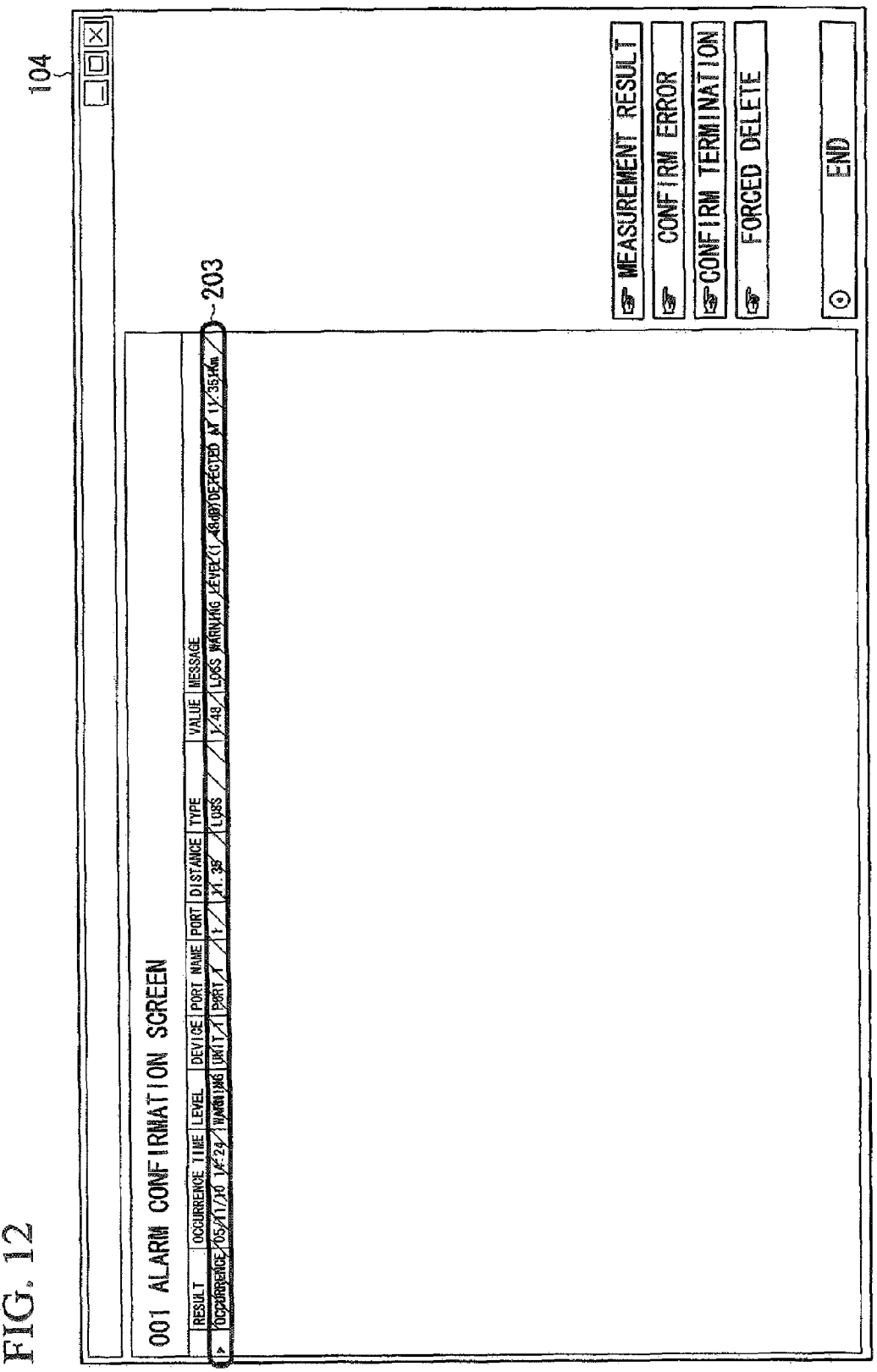
FIG. 12 is a diagram of an alarm confirmation screen (part 7) in the first embodiment.
Figure 13:
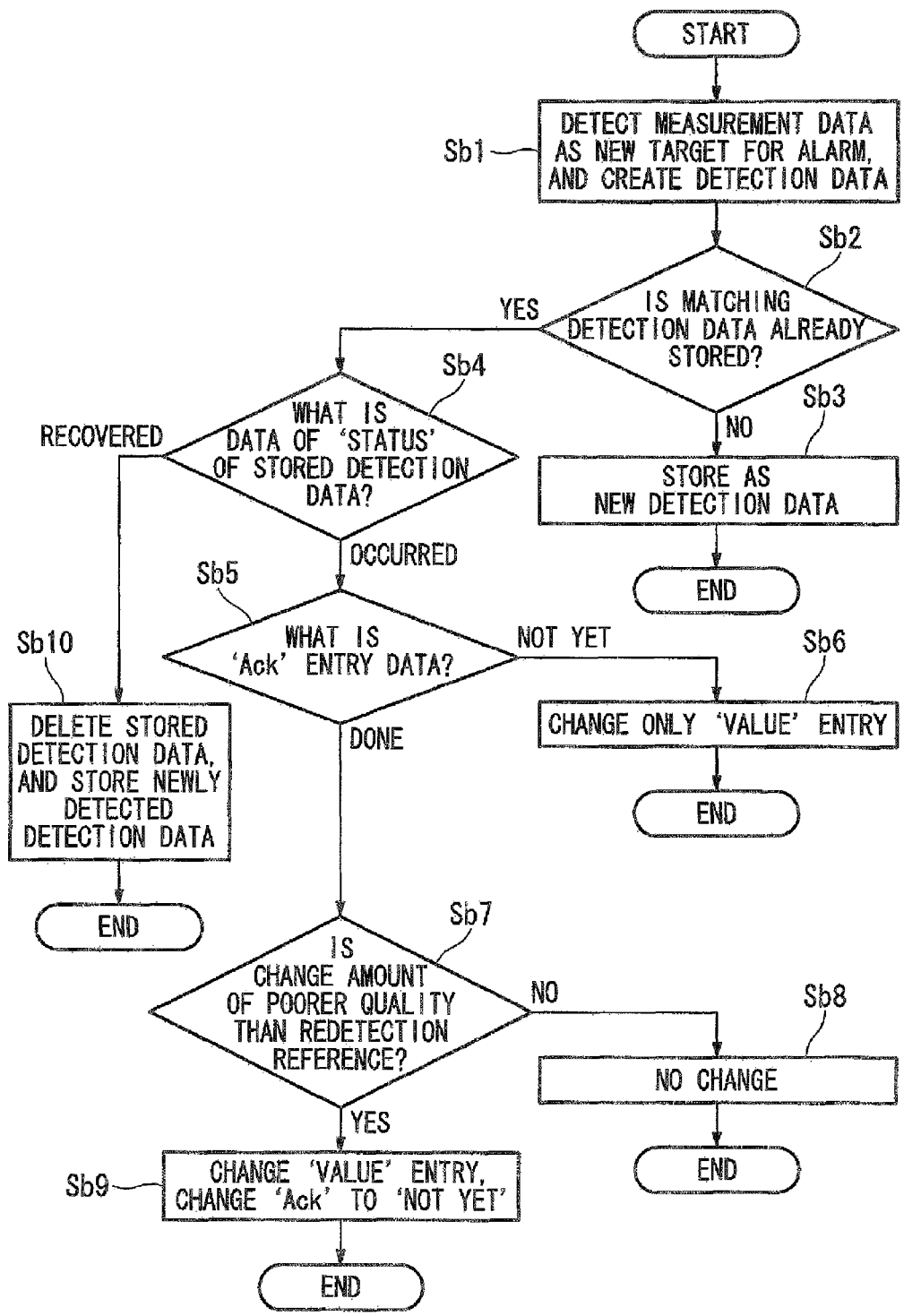
FIG. 13 is a flowchart of an operation of a detector in the first embodiment.

With the row selected, the user manipulates the mouse 31 to select an 'Error Confirmation' button (reference numeral 302) in the alarm continuation screen 102 displayed on the screen 32 (FIG. 10: click (2)). The input unit 14 receives this selection inputs error selection command data to the exclusion data processing unit 12. The exclusion data processing unit 12 that the error selection command data is input to displays a small window for 'Error Confirmation' (reference numeral 402) shown in FIG. 11. The user then manipulates the mouse 31 and, in the small window for 'Error Confirmation' (reference numeral 402), selects a 'Yes' button (reference numeral 403) (FIG. 11: click). The exclusion data processing unit 12 that receives this selection reads data of the selected row from an internal storage region, stores 'OK' in the 'Ack' column of the detection data of the detection data storage unit 16 corresponding to the data of the read row, and notifies the alarm output unit 13 that the detection data has been changed (step Sa9). The notified alarm output unit 13 retrieves the detection data stored in the detection data storage unit 16, and, when it detects that 'Type' has 'OK' stored in the 'Ack' entry of the record for 'Loss' or 'Reflection', changes the display color of the alarm data displayed in the alarm confirmation screen 100 shown in FIG. 12, and, when there is no other alarm data for notification, transmits a stop command to the notification device 33 (step Sa10).

By this process, in regard to alarm data corresponding to termination, other alarm data in the screen can be displayed in a recognizable color, making it easy for the user to distinguish between confirmed alarm data and unconfirmed alarm data.

When the detecting unit 11 stores detection data detected and created from new measurement data (hereinafter 'new detection data') in the detection data storage unit 16 (step Sb1), it determines whether the new detection data is already stored in the detection data storage unit 16. The determination of whether the new detection data is identical to detection data that is already stored is made by determining whether 'Line data', 'Type', and 'Distance' in the detection data storage unit 16 of FIG. 3 match (step Sb2). When matching detection data is not stored, the detecting unit 11 stores the new detection data in the detection data storage unit 16, and, since the status has changed, notifies the alarm output unit 13 that new detection data has been stored. The notified alarm output unit 13 creates alarm data from the detection data, displayed it on the screen 32, and transmits a start command to the notification device 33 (step Sb3).

On the other hand, when detection data that matches the new detection data is stored in the detection data storage unit 16, the detecting unit 11 determines whether the 'Status' entry of the stored detection data is 'Generated' or 'Recovered' (step Sb4), When the 'Status' is 'Generated', the detecting unit 11 determines whether the 'Ack' entry of the stored detection data is 'Not Yet' or 'OK' (step Sb5). When the detecting unit 11 determines that the 'Ack' entry is 'Not Yet', the detecting unit 11 changes the 'Value' entry of the detection data that has already been notified to the value of the new detection data. The data is not changed at this time, to leave the first occurrence date and time. Although the data in the 'Status' entry of the detection data storage unit 16 is not changed at this time, since the detection data storage unit 16 is updated, the detecting unit 11 notifies the alarm output unit 13 that new detection data has been stored. The alarm output unit 13 receives this notification, creates alarm data from the new detection data, and displays it on the screen 32 (step Sb6).

On the other hand in step Sb5, when the detecting unit 11 determines that the 'Ack' entry is 'OK', it calculates the difference between the data of the 'Value' entry of the detection data that is already stored and the data in 'Value' of the new detection data, compares the amount of change indicated by the difference with the reference amount for redetection stored in the reference data storage unit 15, and determines whether its quality is poorer, that is, in the case of the loss amount, whether it exceeds the redetection reference loss amount, or, in the case of the reflection attenuation amount, whether it is below the redetection reference reflection attenuation amount (step Sb7). When the new detection data is a loss amount, if the calculated difference does not exceed the redetection reference loss amount stored in the reference data storage unit 15, the detecting unit 11 deems that there is no status change, and ends the process of updating the detection data storage unit 16. This is due to the fact that, if 'Value' is changed in that state, it will be impossible to calculate the difference from the point of first occurrence. When the new detection data is a reflection attenuation amount, if the calculated difference is below the redetection reference reflection attenuation amount stored in the reference data storage unit 15, the detecting unit 11 deems that there is no status change, and ends the process of updating the detection data storage unit 16 (step Sb8).

On the other hand in step Sb7, when the new detection data is a loss amount, if the calculated difference exceeds the redetection reference loss amount stored in the reference data storage unit 15, the detecting unit 11 deems that the status has changed, rewrites the 'Value' entry of the detection data storage unit 16 to the 'Value' of the new detection data, and changes the 'Ack' entry to 'Not Yet' such that it can be reconfirmed. In the operation type 3, when the new detection data is a reflection attenuation amount, if the calculated difference exceeds the redetection reference reflection attenuation amount stored in the reference data storage unit 15, the detecting unit 11 deems that the states has changed, rewrites the 'Value' entry of the detection data storage unit 16 to the 'Value' of the new detection data, changes the 'Ack' entry to 'Not Yet' such that it can be reconfirmed, and notifies the alarm output unit 13 that new detection data has been stored. Since the 'Ack' entry is 'Not Yet', the notified alarm output unit 13 changes the screen display color to a display color for a normal alarm, and transmits a start command to the notification device 33 (step Sb9).

On the other hand in step Sb4, when the detecting unit 11 determines that the 'Status' of the detection data already stored is 'Recovered', it deems that the status has changed, deletes the detection data of the detection data storage unit 16 that matches the new detection data, stored the new detection data in the detection data storage unit 16, and notifies the alarm output unit 13 that new detection data has been stored. The notified alarm output unit 13 creates alarm data from the new detection data, displays it on the screen, and transmits a start command to the notification device 33 (step Sb10). When 'Status' is 'Recovered', for detection data whose 'Ack' is 'OK', in changing 'Ack' to 'OK', the exclusion data processing unit 12 determines whether 'Status' is 'Recovered', and, if so, the exclusion data processing unit 12 deletes it from the detection data storage unit 16, whereby the detection data storage unit 16 contains no detection data whose 'Status' is 'Recovered' and whose 'Ack' is 'OK'.

With this configuration, the optical transmission line can be monitored without pre-registering device data and initial measurement data. Moreover, since the user can perform a confirmation operation and select whether to display a candidate for termination that is not an abnormality, he can ensure that only irregular data requiring repair is displayed. For an alarm requiring repair, the user can perform confirmation operations that, in regard to the screen display, change the display color and terminate an notification, making it easy to identify alarm data confirmed by the user. For detection data whose alarm notification is terminated by a confirmation operation made by the user, if the amount of change exceeds a reference value for redetection stored beforehand, the alarm is notified again. This makes it possible to monitor status changes of failures that have previously been detected as alarms.

Figure 14:
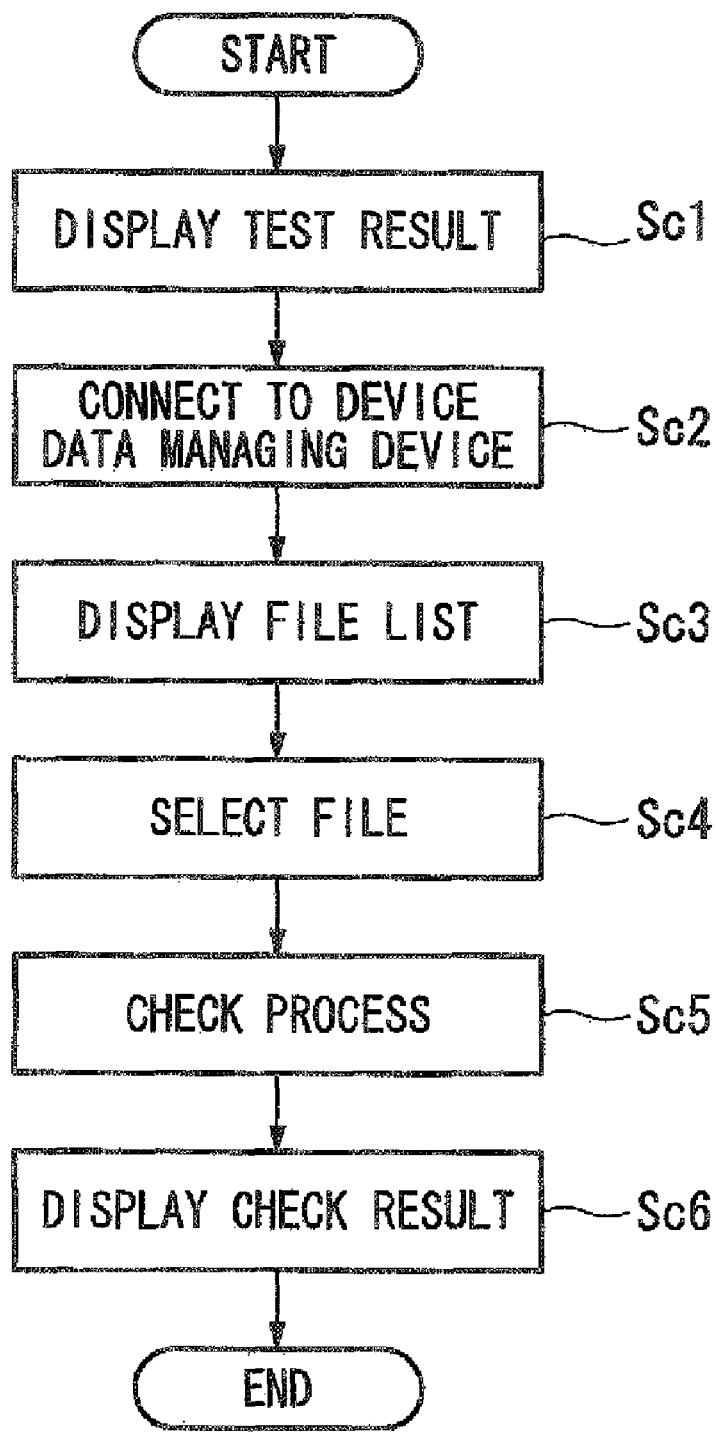
FIG. 14 is a flowchart of an operation of an device data display unit in the first embodiment.

Next, an operation of the device data display unit 17 will be explained with reference to FIGS. 14 to 17. FIG. 14 is a flowchart of an overall process executed by the device data display unit 17 when controlled by a user.

Firstly, by manipulating the keyboard 30 or the mouse 31, the user performs an operation to activate a test result detail display screen. The input unit 14 that receives this operation inputs an activation command for test result detail display screen to the device data display unit 17. The device data display unit 17 that this activation command is input to reads measurement data from the measurement data storage unit 19, and displays an device data detail display screen 500 shown in FIG. 15 on the screen 32. A list of measurement data is displayed in a display region (reference numeral 501) of the device data detail display screen 500 (step Sc1). Next, the user manipulates the mouse 31 in selecting a button for device management coordination (reference numeral 502) of the device data detail display screen 500, whereby the input unit 14 inputs command data for which device management coordination is selected to the device data display unit 17. The device data display unit 17 that this command data is input to connects via the connection unit 10 to the device data managing device 80 (step Sc2), and, as shown in FIG. 16, a small window (reference numeral 600) displaying a list of device data files stored in the device data managing device 80 is displayed (step Sc3).

Figure 17:
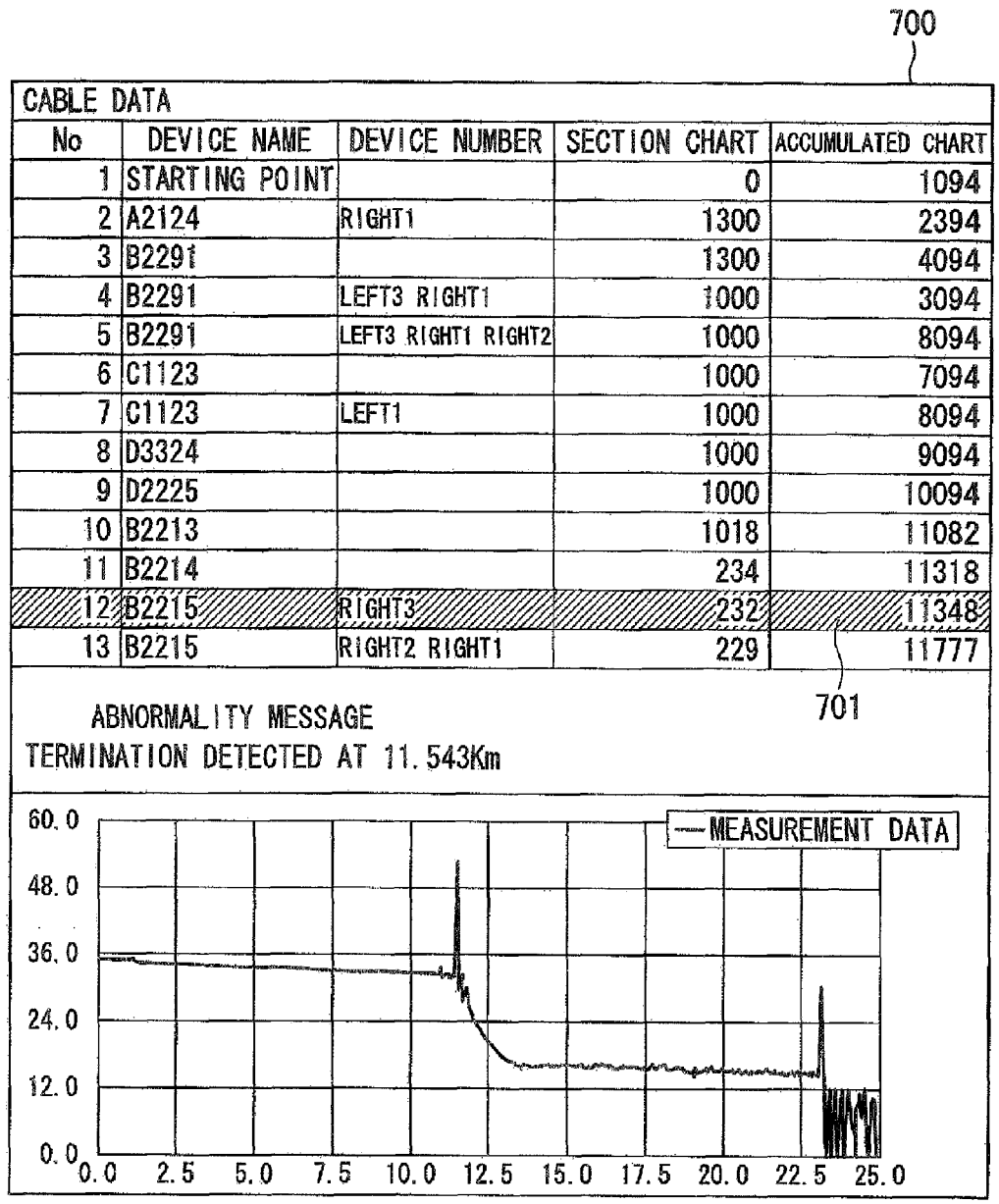
FIG. 17 is a diagram of a list display screen of device data in the first embodiment.

The small window (reference numeral 600) includes a display region (reference numeral 601) for displaying a list of file names of files of device data. In this display region (reference numeral 601), a user manipulates the mouse 31, selects one file name, and, while it is selected, further manipulates the mouse 31 to select an 'Open' button (reference numeral 602) (step Sc4). When the selected pieces of data are input from the input unit 14, the device data display unit 17 receives a file of device data having the selected file name from the device data managing device 80, and makes a verification of device data contained in the received file and detection data stored in the detection data storage unit 16 (step Sc5). The device data display unit 17 then displays a list display screen (reference numeral 700) of the received device data as shown in FIG. 17, and, in the list display screen (reference numeral 700), changes the display color of the device data containing the detection data (reference numeral 701) (step Sc6).

This configuration makes it possible to limit the range of closures where there is a failure and devices such as optical fibers, and to identify locations of failures.

Figure 18:
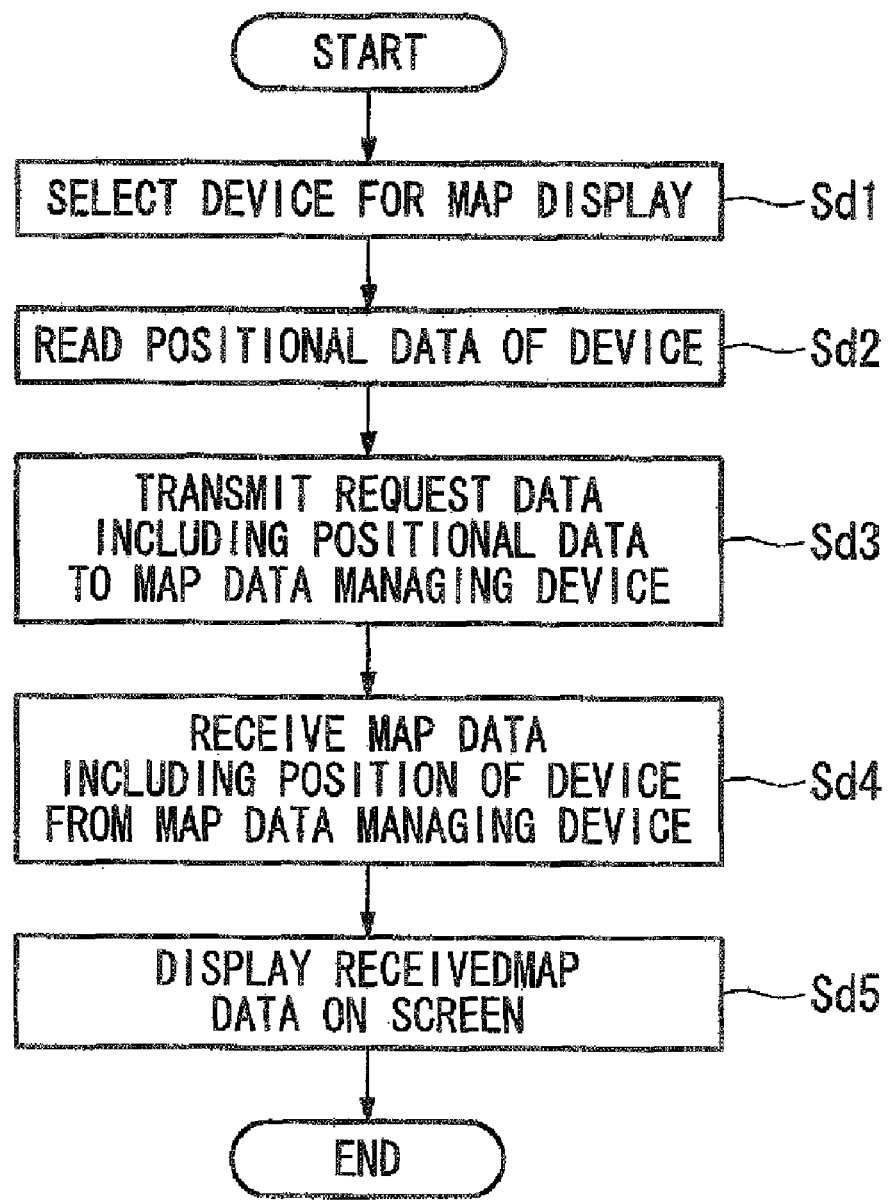
FIG. 18 is a flowchart of an operation of a positional data display unit in the first embodiment.
Figure 19:
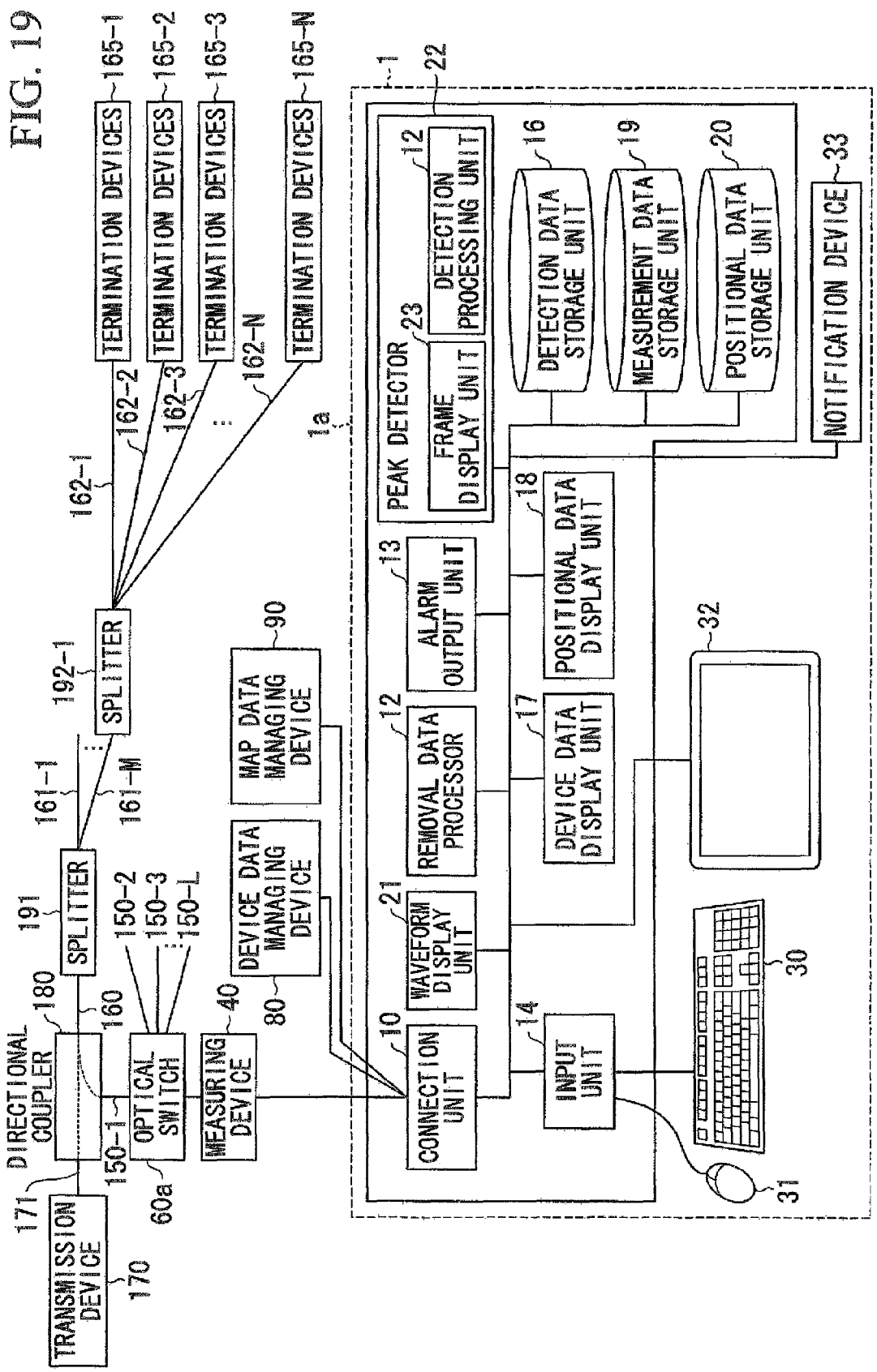
FIG. 19 is a block diagram of the relationship between an internal configuration of an optical transmission line monitoring device according to a second embodiment, and devices connected to the monitoring device.

Next, an operation of the positional data display unit 18 will be explained with reference to FIGS. 18 and 19. FIG. 18 is a flowchart of an overall process performed by the positional data display unit 18 when controlled by a user.

Figure 15:
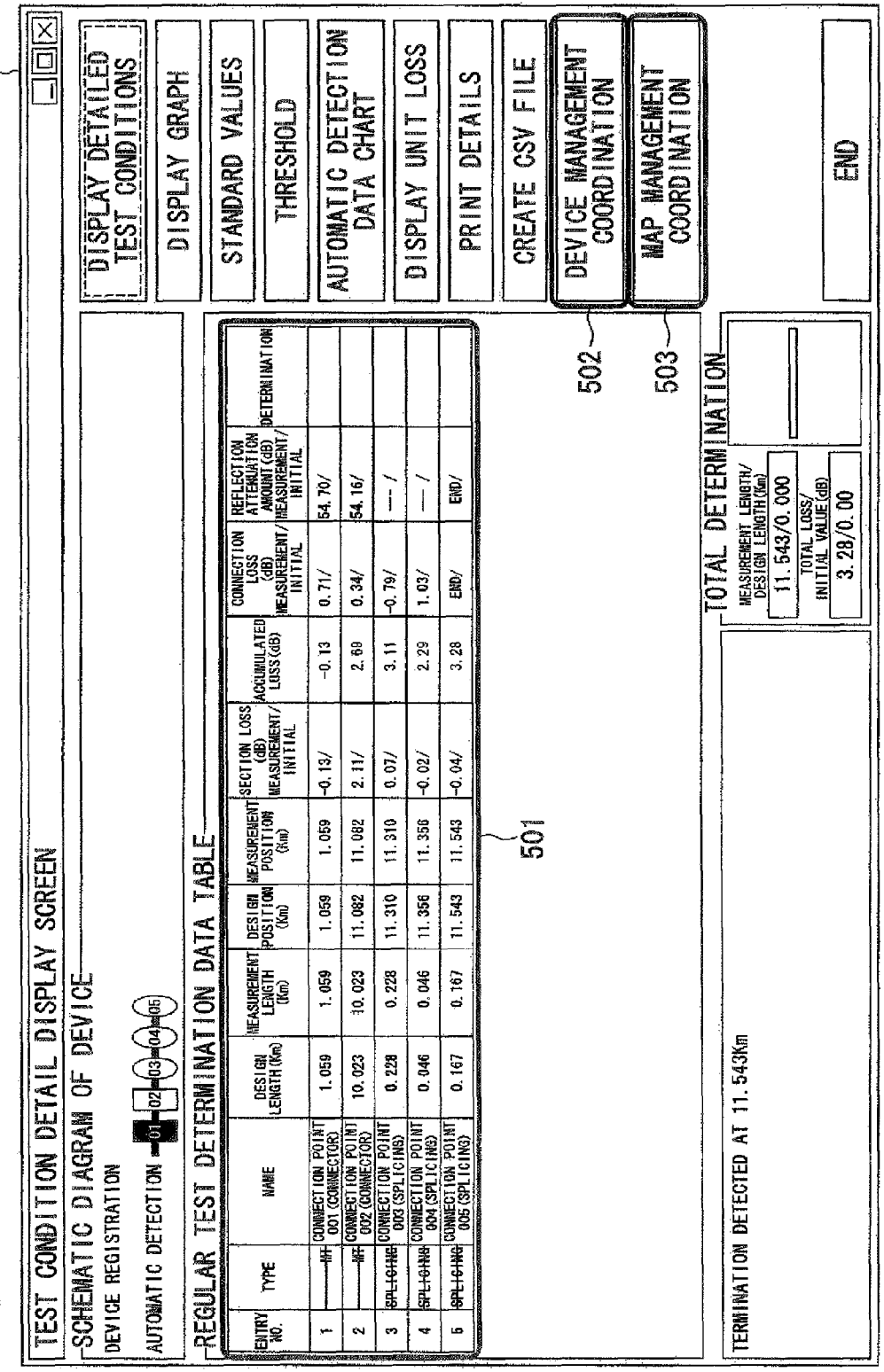
FIG. 15 is a diagram of a detailed result details display screen (part 1) in the first embodiment.
Figure 16:
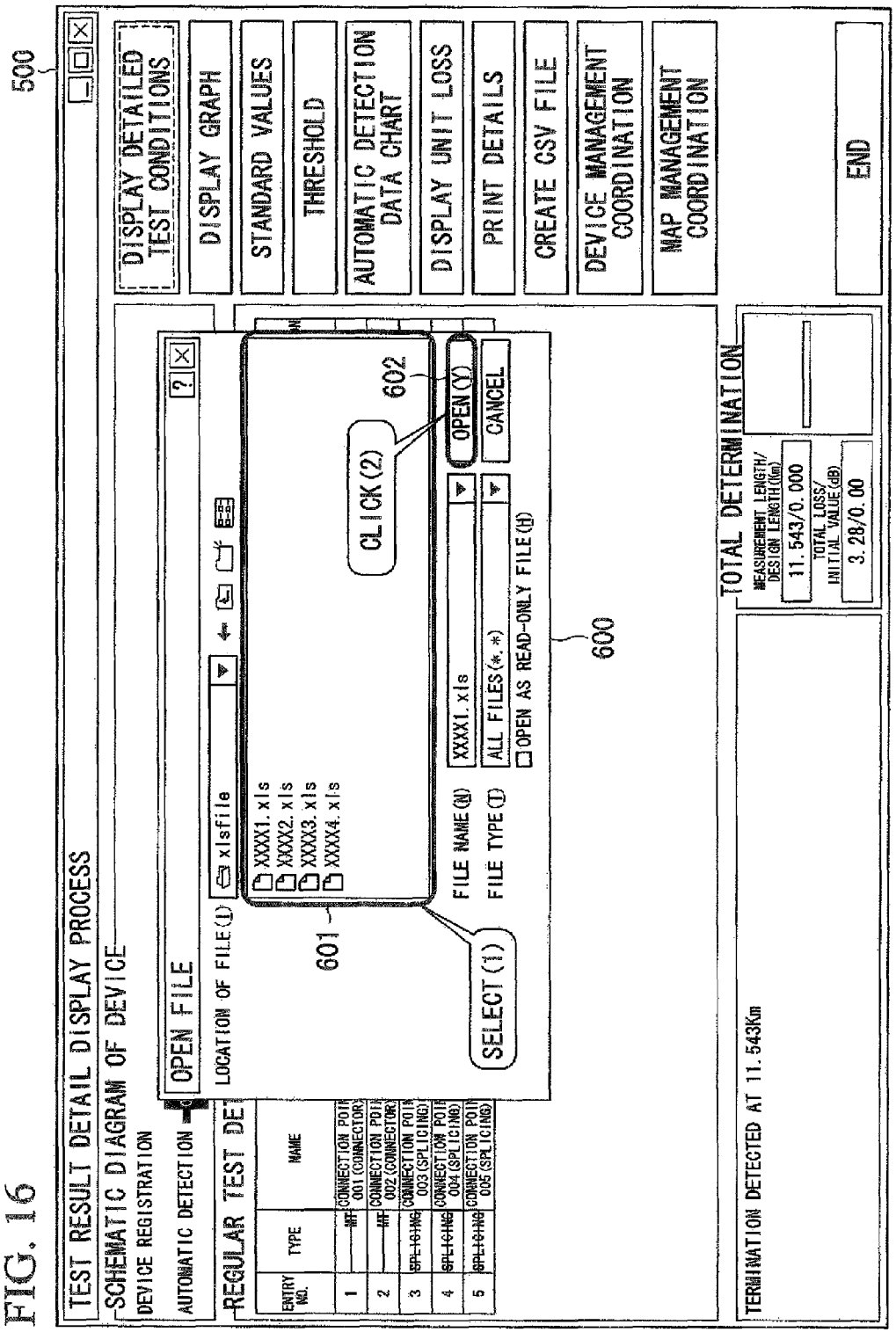
FIG. 16 is a diagram of a detailed result details display screen (part 2) in the first embodiment.

Firstly let us suppose that the device data detail display screen 500 shown in FIG. 15 is displayed on the screen 32 at the device data display unit 17. In this state, the user manipulates the mouse 31 and selects one of the pieces of measurement data displayed in the display region (reference numeral 501). While this is selected, when the user further manipulates the mouse 31 and selects the map management coordination button (reference numeral 503), the input unit 14 inputs the command data for which map management coordination is selected to the positional data display unit 18 (step Sd1). The positional data display unit 18 that the command data is input to reads the 'Measurement Position' data of the measurement data selected in the display region (reference numeral 501), and reads positional data containing degrees of latitude and longitude corresponding to the status of the read 'Measurement Position' from the positional data storage unit 20 (step Sd2). The positional data display unit 18 then transmits request data containing the read positional data to the map data managing device 90 (step Sd3). The map data managing device 90 reads the positional data contained in the received request data, retrieves surrounding map data that contains the read positional data, and transmits the retrieved map data as a reply to the positional data display unit 18, whereby the positional data display unit 18 receives the transmitted map data (step Sd4). The positional data display unit 18 then displays the map data it received from the map data managing device 90 on the screen 32 (step Sd5).

The map data managing device 90 can be a map data server or the like connected to the internet or the like. In that case, the request data transmitted by the positional data display unit 18 must be created by the positional data display unit 18 in compliance with an application interface (API) of the map data server. For example, in the case of a map server device provided by Google (Registered Trademark), map data can be obtained by creating a universal resource locator (URL) that contains data contending degrees of latitude and longitude, such as 'http://maps.google.co.jp/maps?11=36.538881, 136.586494&spn=0.033150,0.057322&hl=ja', and transmitting it to the map server device.

With this configuration, positions of failures can be displayed in the map data, enabling the user to easily ascertain the geographical locations of the failures.

While the first embodiment describes a star-type interconnection as a specific example of an optical transmission line, the invention is not limited to this, it being possible to use a passive optical network (PON) system in which one optical fiber is split by a splitter, and the split optical fibers accommodate terminating devices provided at a plurality of users' homes. In that case, in addition to connection points such as splicing points and connectors, the connection point of the splitter is also monitored.

Second Embodiment

Next, an optical transmission line monitoring device 1a for monitoring a PON system optical transmission line will be explained as a second embodiment of the invention. As shown in FIG. 19, an optical transmission line according to the second embodiment is a PON system optical transmission line including an optical fiber 160, a splitter 191, optical fibers 161-1 to 161-M, a splitter 192-1, optical fibers 162-1 to 162-N, and terminating devices 165-1 to 165-N used in homes of users. Like constituent parts of the first embodiment are designated with like reference numerals, and only parts which differ from the first embodiment are explained below.

The splitters 191 and 192-1 are devices that split or combine optical signals, and are also known as optical couplers. For example, the splitter 191 splits an optical signal from the optical fiber 160 into a plurality of optical fibers 161-1 to 161-M, and combines optical signals from the plurality of optical fibers 161-1 to 161-M onto the optical fiber 160. While splitters generally make 4, 8, 16, or 32 splits, the number of splits can be increased by connecting splitters in multiple stages.

A directional coupler (optical coupler) 180 includes three connection terminations that connect to optical fibers. At these respective connection terminations, optical fiber 160 connects to the splitter 191, optical fiber 150-1 connects to an optical switch 60a, and optical fiber 171 connects to a transmission device 170. The directional coupler 180 makes wavelength-dependent splits and combinations, combining communication light that is incident through optical fiber 171 via the transmission device 170 with an optical pulse that is incident from the measuring device 40 via optical fiber 150-1 and the optical switch 60a, and outputting this to the optical fiber 160. When light waves are incident from the optical fiber 160, instead of outputting reflected waves of communication light to optical fiber 150-1, the directional coupler 180 outputs them to optical fiber 171 connected to the transmission device 170. Returning light of the optical pulse is output by the directional coupler 180 to the optical fiber 150-1 connected to the optical switch 60a, and not to optical fiber 171.

One connection termination of the optical switch 60a connects to the measuring device 40, and its other connected termination connect to optical fibers 150-1 to 150-L. Based on a switch command input thereto, the connection termination connected to the measuring device 40 is connected to one of the connection terminations of the optical fibers 150-1 to 150-L. In FIG. 19, optical fiber 150-1 is selected.

The optical transmission line monitoring device 1a differs from the optical transmission line monitoring device 1 of the first embodiment in that it includes a waveform display unit 21 that displays light intensity and distance of returning light on a coordinate axis, a peak detector 22 that detects the location of a reflection peak of returning light intensity in a monitoring region selected arbitrarily by a user, an alarm output unit 13a, and a exclusion data processing unit 12a. These differing parts of the configuration are explained below.

The waveform display unit 21 displays measurement data input from the measuring device 40 via the connection unit 10 as a waveform on the screen 32. The peak detector 22 includes a frame display unit 23 and a detection processing unit 24. The frame display unit 23 displays a frame in a region identified by coordinates input from the input unit 14 when it detects that the user manipulates the mouse 31, on the screen 32 where the waveform display unit 21 displays the waveform. The detection processing unit 24 detects the peak of a waveform in the region identified by the frame display unit 23, makes an analysis based on data relating to the optical intensity and distance at the peak, calculates the reflection attenuation amount of the optical transmission line, and records the distance and the calculated reflection attenuation amount in the measurement data storage unit 19. As in the first embodiment, the reflection attenuation amount is recorded in units of decibels (dB).

The detection processing unit 24 creates the detection data shown in FIG. 3 of the first embodiment, stores the created data in the detection data storage unit 16, and notifies the alarm output unit 13a that new detection data has been stored. In the second embodiment, when creating new detection data, 'Reflection' is recorded in the 'Type' entry, and, when identified by a confirmation operation (described below) as a PON system terminating device 165-1 to 165-N, 'PON' is recorded in the 'Type' entry.

When creating new detection data while detection data is already stored in the detection data storage unit 16, the detection processing unit 24 detects detection data corresponding to the created detection data from the detection data storage unit 16. When output removal data is stored in the detection data detected from the detection data storage unit 16 (i.e. when 'OK' is recorded in the 'Ack' entry), the detection processing unit 24 determines whether the reflection attenuation amount in the new detection data has increased, by using the reflection attenuation amount included in the detection data as a reference. When the detection processing unit 24 determines that the reflection attenuation amount in the new detection data has increased with respect to the reference reflection attenuation amount, it deletes the detection data in the detection data storage unit 16 corresponding to the new detection data, stores the new detection data in the detection data storage unit 16, rewrites the 'Ack' entry to 'Not Yet', and notifies the alarm output unit 13a that new detection data has been stored.

When the alarm output unit 13a receives notification from the detection processing unit 24 that new detection data has been stored, it creates, based on the detection data stored in the detection data storage unit 16, display data corresponding to the alarm data of the first embodiment, outputs the created display data to the screen 32, and, outputs, from among the output display data, display data having 'Not Yet' in the 'Ack' entry of the corresponding detection data, to the screen 32 in a display color that indicates alarm; in addition, the alarm output unit 13a transmits a start command to the notification device 33. Output display data having 'Processed in the 'Ack' entry of the corresponding detection data is displayed in a display color other than one indicating an alarm.

When the alarm output unit 13a receives notification from the exclusion data processing unit 12a that the detection data has been changed, from among the detection data stored in the detection data storage unit 16, the alarm output unit 13a changes the display color of display data having 'Not Yet' in its 'Ack' entry to a display color indicating an alarm. In addition, the alarm output unit 13a transmits a stop command to the notification device 33 to make it stop the notification.

When making notification of a subsequent alarm, the alarm output unit 13a transmits a start command to the notification device 33.

In addition to alarm confirmation made by the exclusion data processing unit 12 in the first embodiment, the exclusion data processing unit 12a performs a PON confirmation process of confirming whether a peak detected by the peak detector 22 is caused by reflection from the terminating devices 165-1 to 165-N in the PON system optical transmission line. A process of the optical transmission line monitoring device 1a according to the second embodiment will be explained below.

PON Confirmation Operation and Alarm Confirmation Operation

Figure 20:
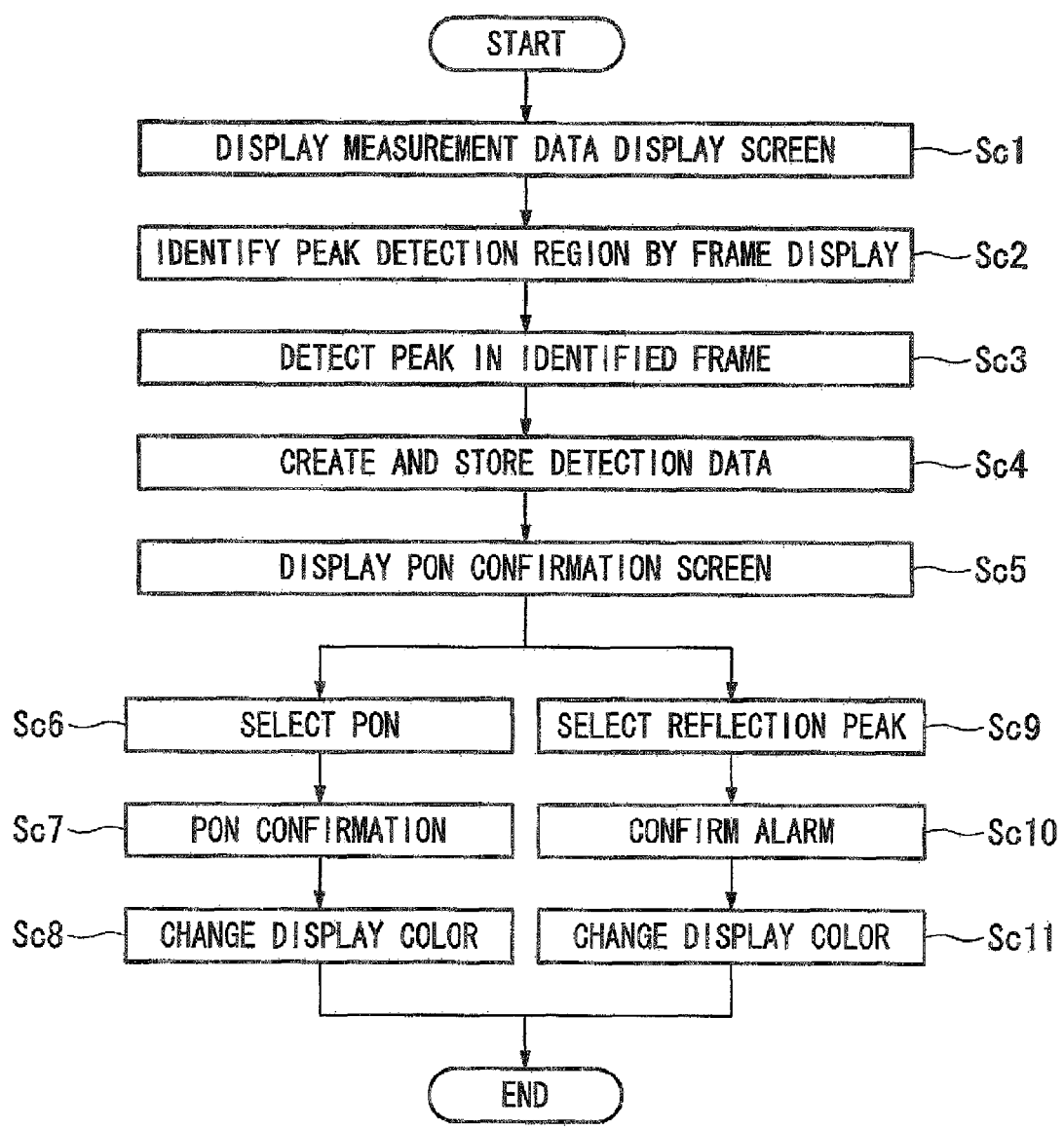
FIG. 20 is a flowchart of processes of PON confirmation and alarm confirmation in the second embodiment.

Firstly, a confirmation operation in a PON system optical transmission line will be explained with reference to FIGS. 20 to 26. FIG. 20 is a flowchart of a PON confirmation operation and an alarm confirmation operation. Explanation with reference to FIGS. 20 to 26 will follow the flow of these operations.

Figure 21:
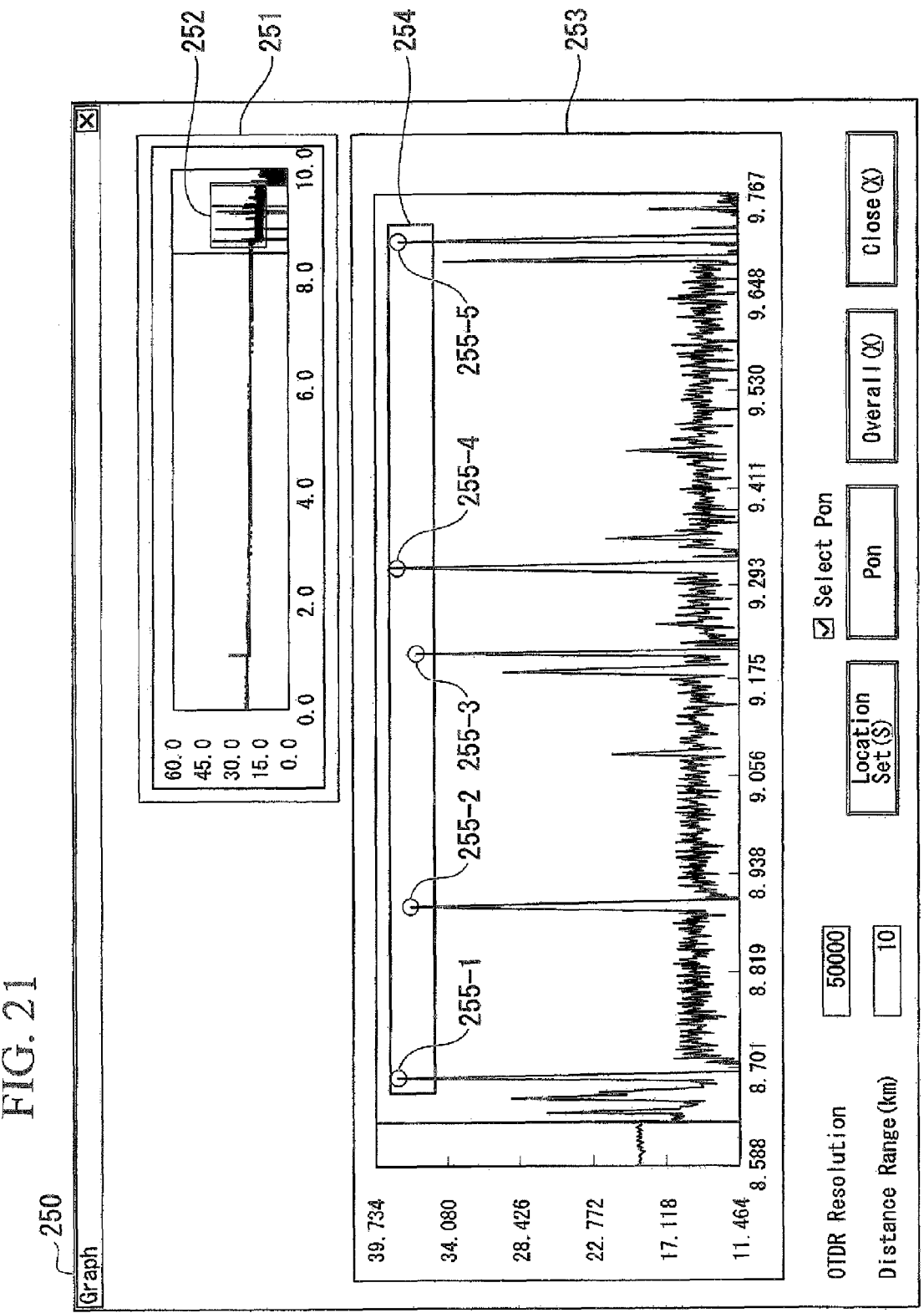
FIG. 21 is a diagram of a measurement data display screen in the second embodiment.

In FIG. 21, the input unit 14 receives a command from the user who manipulates the keyboard 30 and the mouse 31, and inputs a display command to the waveform display unit 21. On the screen 32, the waveform display unit 21 displays a measurement data display screen 250 that displays a waveform based on measurement data received from the measuring device 40 (step Sc1).

The measurement data display screen 250 includes an all measurement data display region 251 and a partial measurement data display region 253. The all measurement data display region 251 displays all the measurement data received from the measuring device 40 as a waveform, with the horizontal axis representing distance and the vertical axis representing optical intensity. The partial measurement data display region 253 displays a partial region selected from the all measurement data display region 251 as an enlarged waveform.

The user selects a partial region in the all measurement data display region 251 by manipulating the mouse 31. In compliance with this manipulation of the mouse 31, the input unit 14 inputs coordinate data in the all measurement data display region 251 to the frame display unit 23. The frame display unit 23 displays a frame 252 in compliance with the input coordinate data, and identifies a region for enlargement. The waveform display unit 21 detects the coordinate data of the frame 252 identified by the frame display unit 23, and displays an enlarged waveform of the measurement data in the region identified by the detected coordinate data in the partial measurement data display region 253.

In the partial measurement data display region 253, the user visually confirms a peak of the returning light generated by reflection from the terminating devices 165-1 to 165-N, and manipulates the mouse 31 such that a frame 254 encloses the peak. The input unit 14 detects this manipulation of the mouse 31, and inputs coordinate data to the frame display unit 23. The frame display unit 23 identifies a region by displaying the frame 254 in the partial measurement data display region 253 (step Sc2).

The detection processing unit 24 detects peak portions of the optical intensity in the region identified by the frame display unit 23, i.e. peaks 255-1 to 255-5 in FIG. 21 (step Sc3). The detection processing unit 24 then creates detection data based the distances and optical intensity of the detected peaks. The detection processing unit 24 stores the created detection data in the detection data storage unit 16 using the format shown in FIG. 3. When the detection processing unit 24 first stores the detection data in the detection processing unit 24, it stores data contained in the measurement data corresponding to the locations of the peaks in 'Occurrence Time', 'Line Data', and 'Distance'. The detection processing unit 24 stores 'Generated' in the 'Status' entry, and 'Reflection' in the 'Type' entry, In 'Value', the detection processing unit 24 stores the reflection attenuation amount calculated for each peak, and stores 'Not Yet' in 'Ack'. In 'Message', as in the first embodiment, it stores a message displayed when the alarm output unit 13a outputs to the screen 32. The detection processing unit 24 then notifies the alarm output unit 13a that new detection data has been stored (step Sc4).

Figure 22:
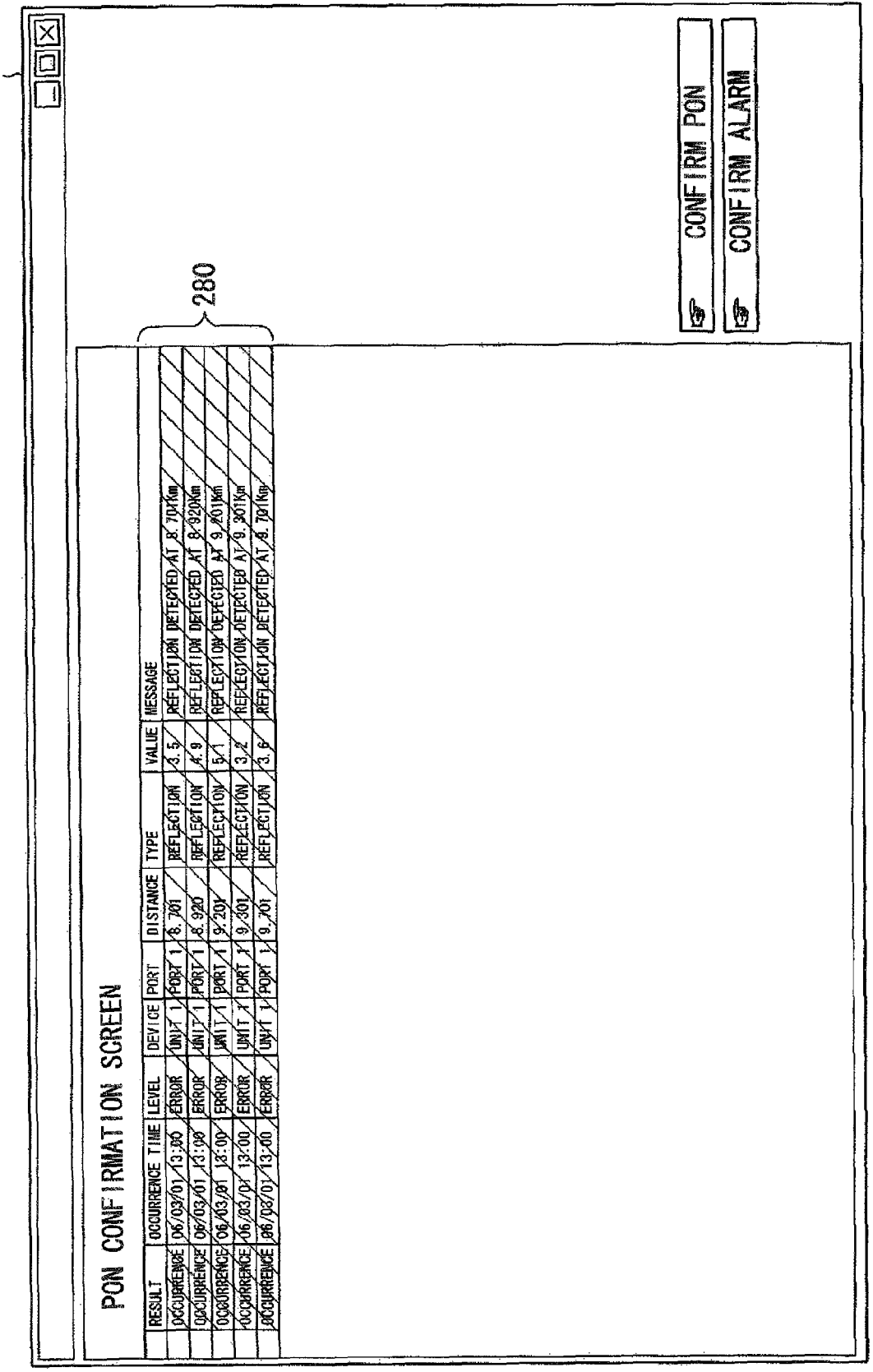
FIG. 22 is a diagram of a PON confirmation screen (part 1) during PON confirmation process in the second embodiment.

When data indicating that new detection data has been stored in the detection data storage unit 16 is input to the alarm output unit 13a from the detection processing unit 24, the alarm output unit 13a creates display data based on the detection data stored in the detection data storage unit 16, and displays a PON confirmation screen 270 shown in FIG. 22 on the screen 32. The PON confirmation screen 270 shown in FIG. 22 displays display data 280 based on the detection data newly stored in the detection data storage unit 16. Here, since the 'Ack' entries of all the detection data are 'Not Yet', the alarm output unit 13a displays the display data in a color indicating an alarm (step Sc5).

In the display data 280 displayed on the PON confirmation screen 270, the user registers the fact that the reflection is from a terminating device in the PON system optical transmission line, and makes confirmation such that it will not be displayed as an alarm (hereinafter 'PON confirmation').

Figure 23:
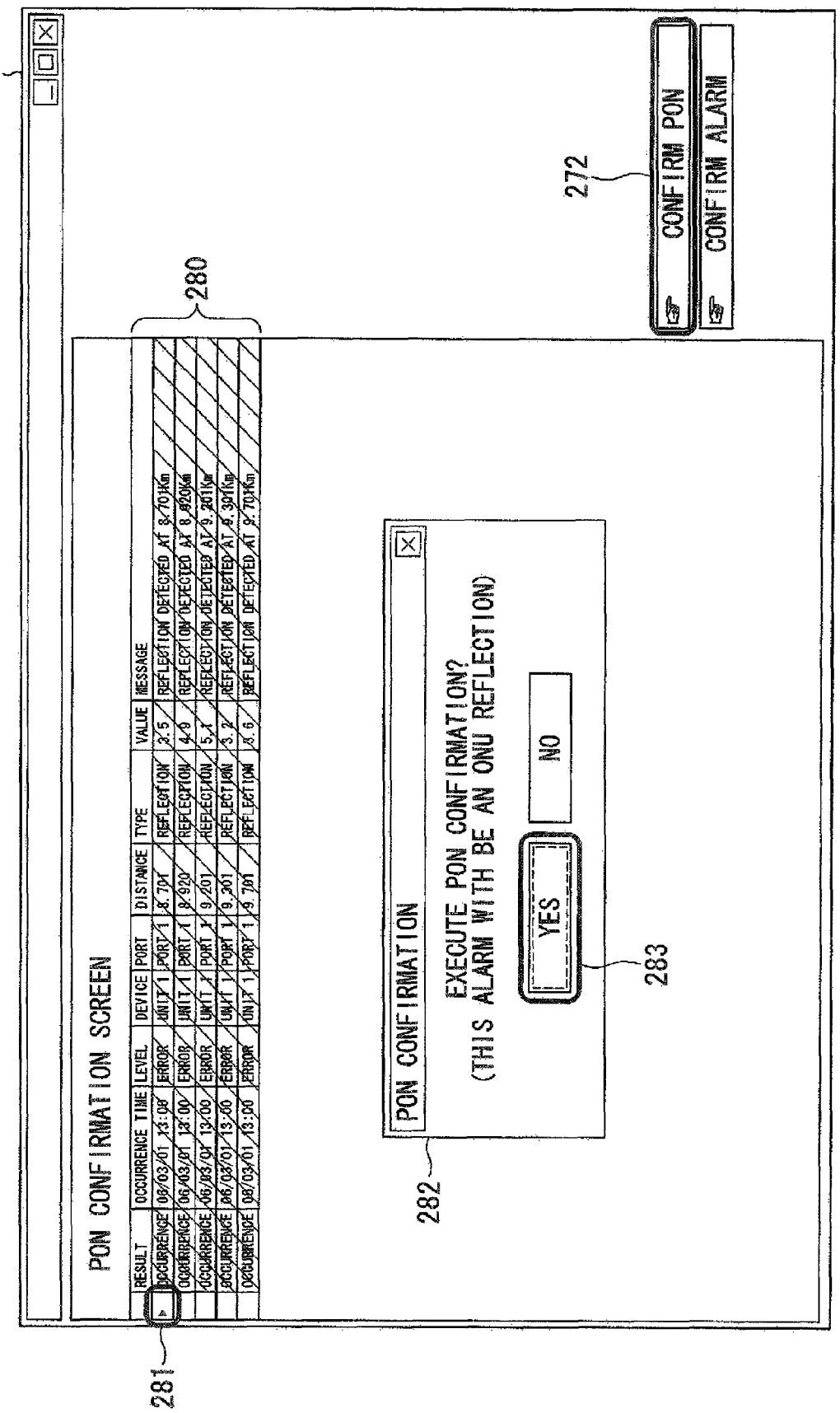
FIG. 23 is a diagram of a PON confirmation screen (part 2) during PON confirmation process in the second embodiment.

Specifically, as shown in FIG. 23, when data displayed in the uppermost row of the display data 280 requires PON confirmation, the user manipulates the mouse 31 and selects a check box 281 of that row. The input unit 14 receives that selection, and inputs selection command data to the exclusion data processing unit 12a. The exclusion data processing unit 12a inputs the selection command data, and stores data of the selected row in an internal storage region (step Sc6).

With the row selected, the user manipulates the mouse 31 and selects a 'PON confirmation' button 272 on the PON confirmation screen 270. The input unit 14 receives this selection, and inputs terminal selection command data to the exclusion data processing unit 12a. The exclusion data processing unit 12a that the termination selection command data is input to displays a small window 282 for 'PON confirmation'. The user then manipulates the mouse 31, and selects a 'Yes' button 283 in the small window 282 for 'PON confirmation' (step Sc7).

The exclusion data processing unit 12a receives this selection, reads the data of the selected row from an internal storage region, stores 'PON' in the 'Type' entry of the detection data in the detection data storage unit 16 corresponding to the data of the read row, and notifies the alarm output unit 13a that the detection data has been changed.

Figure 24:
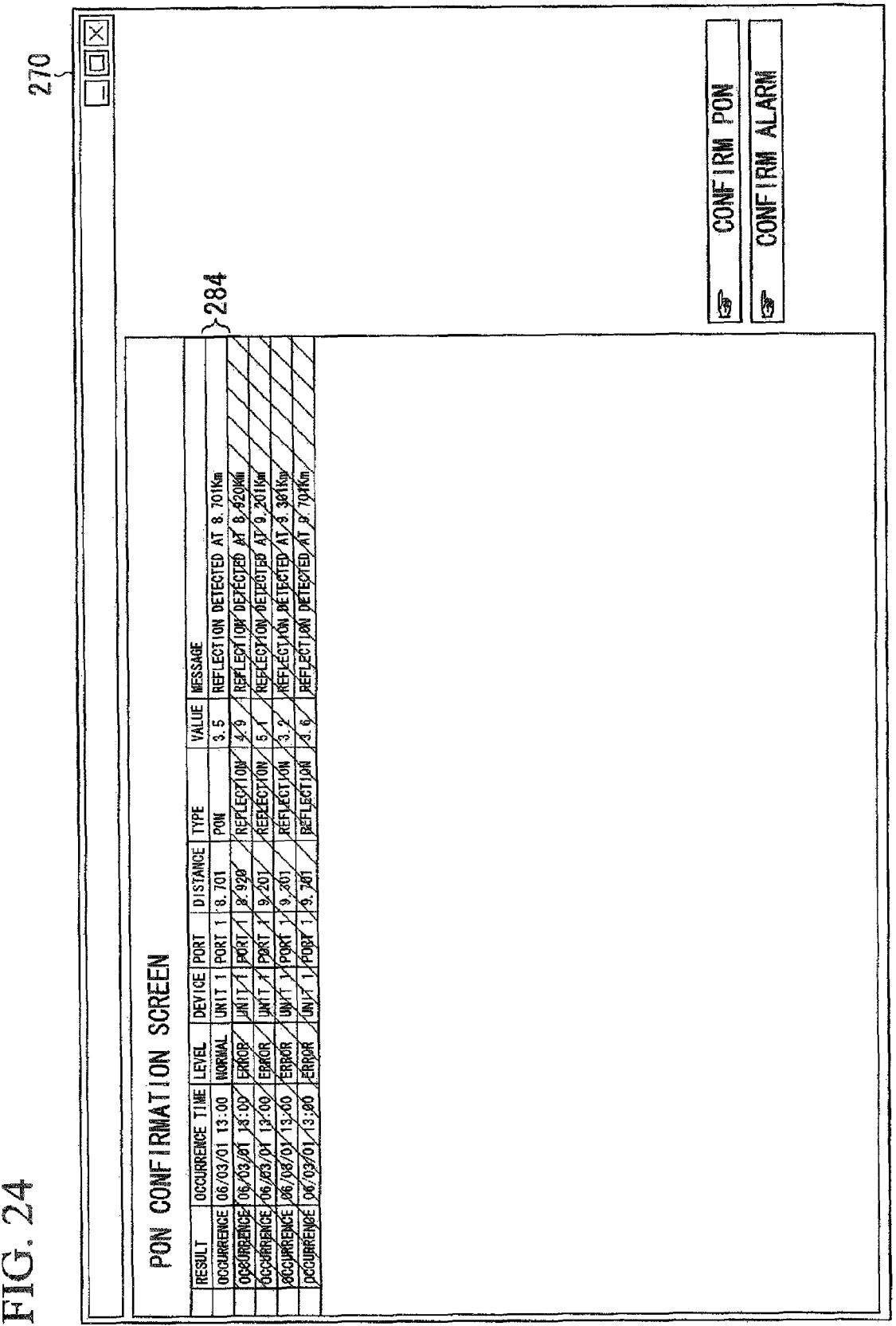
FIG. 24 is a diagram of a PON confirmation screen (part 3) during PON confirmation process in the second embodiment.

The notified alarm output unit 13a retrieves the detection data from the detection data storage unit 16, and retrieves the 'Ack' entry. Display data corresponding to detection data whose 'Ack' entry is 'Not Yet' is displayed by the alarm output unit 13a in a display color indicating an alarm, while display data corresponding to detection data whose 'Ack' entry is 'OK' is displayed by the alarm output unit 13a in a display color other than the color indicating an alarm (step Sc8). In the case of FIG. 23, the display data of the row for which a PON confirmation is made as shown in FIG. 24 is displayed in a display color other than that indicating an alarm. At this time, the data stored in the 'Type' entry of the detection data, i.e. 'PON' is output to the 'Type' entry of the display data 284, and 'Normal' is output to the 'Level' entry. When there is no display data displayed in another alarm display color that is a target for notification, the alarm output unit 13a transmits a stop command to the notification device 33 (step Sc8). Consequently, display data that PON confirmation is made for, i.e. that is confirmed by the user as a peak of the terminating device, can be prevented from being displayed as an alarm.

Figure 25:
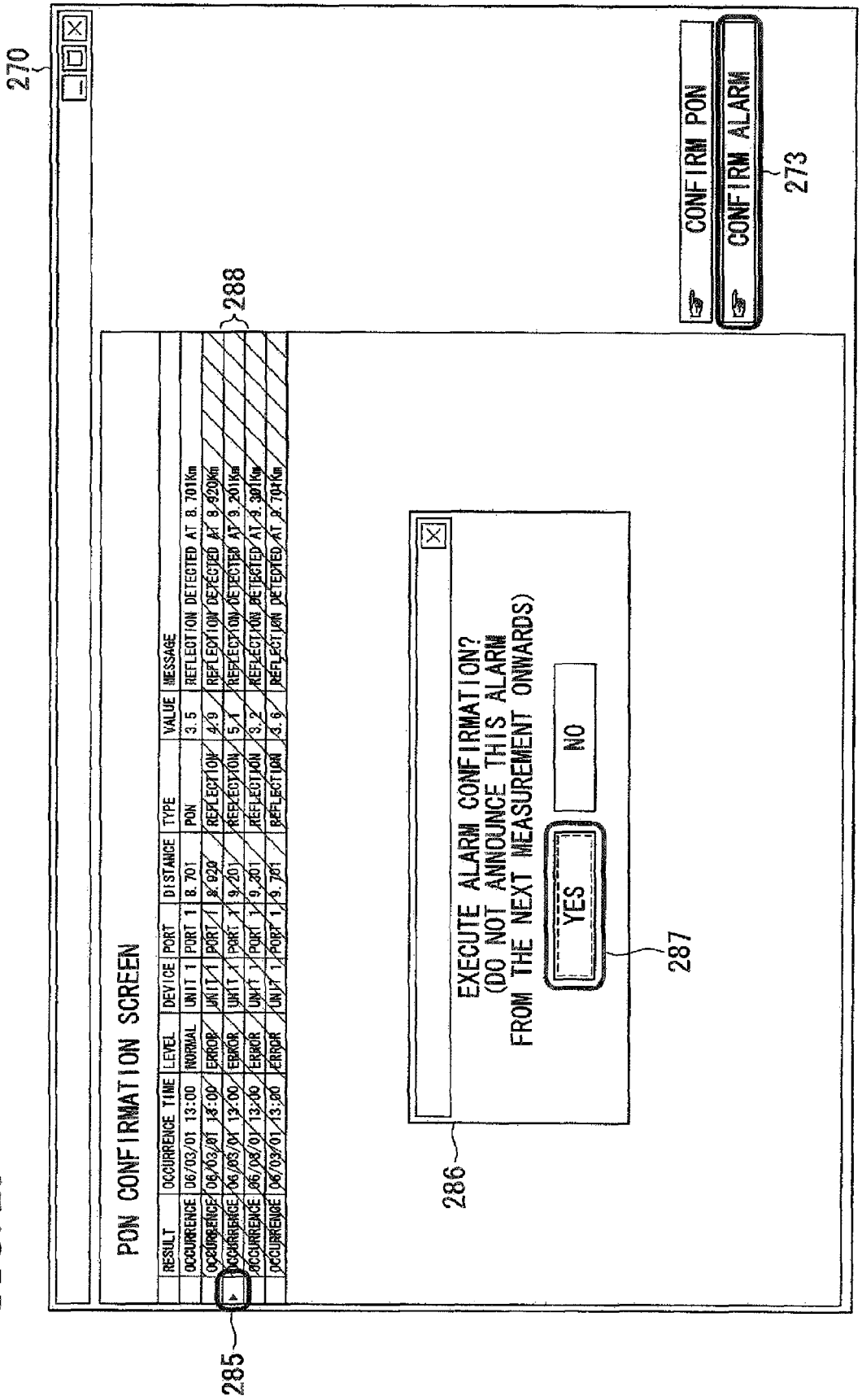
FIG. 25 is a diagram of a PON confirmation screen (part 1) during alarm confirmation in the second embodiment.
Figure 26:
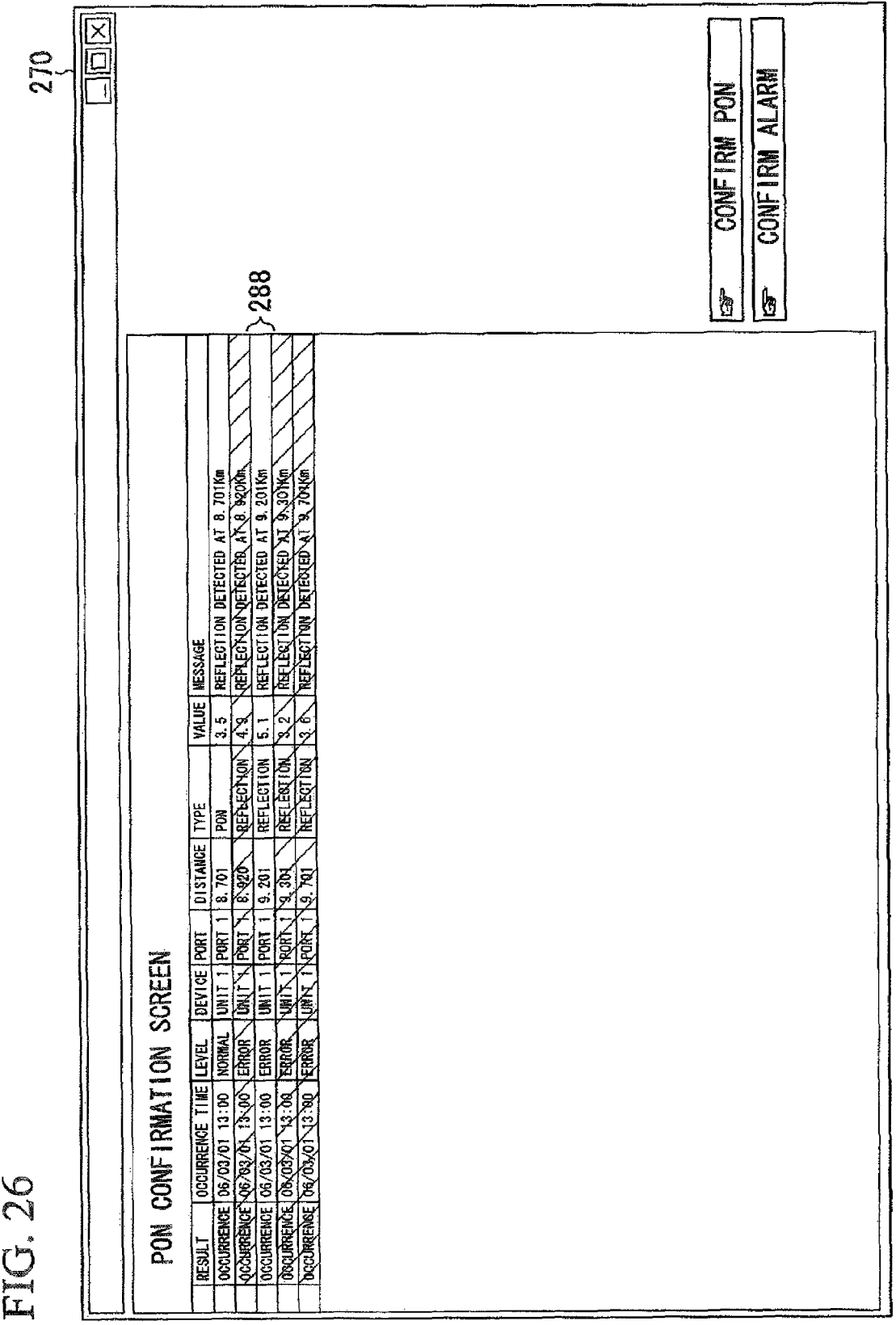
FIG. 26 is a diagram of a PON confirmation screen (part 2) during alarm confirmation in the second embodiment.

Next, an operation for confirmation of an alarm such that peaks of reflections other than those generated by the terminating devices 165-1 to 165-N are excluded from monitoring in subsequent measuring will be explained with reference to FIGS. 25 and 26. Here, peaks of reflections other than those generated by the terminating devices 165-1 to 165-N include reflections from connectors and terminations connected to the optical transmission line. As shown in FIG. 25, based on a manipulation of the mouse 31 by the user in the PON confirmation screen 270 in the same manner as in a PON confirmation, a row (reference numeral 285) displaying display data 288 corresponding to a peak that is the target of the alarm confirmation operation is selected (step Sc9). An alarm confirmation button 273 is then selected, and a 'Yes' button 283 in a small window 282 is selected (step Sc10).

The exclusion data processing unit 12a receives this selection, reads the data of the selected row from an internal storage region, writes 'OK' in the 'Ack' entry of the detection data of the detection data storage unit 16 corresponding to the data of the read row, and notifies the alarm output unit 13a that the detection data has been changed.

The notified alarm output unit 13a retrieves the detection data stored in the detection data, storage unit 16, and retrieves the 'Ack' entry. The alarm output unit 13a displays detection data corresponding to the detection data whose 'Ack' entry is 'Not Yet' in a display color indicating an alarm, and displays detection data corresponding to detection data whose 'Ack' entry is 'OK' in a display color other than one indicating an alarm (step Sc11). In the example of FIG. 25, the display data 284 relating to the detection data detected as shown in FIG. 26 is displayed in a display color other than one that indicates an alarm. When there is no display data displayed in another alarm display color that is a target for notification, the alarm output unit 13a transmits a stop command to the notification device 33 (step Sc11). This ensures that display data confirmed by the user to be a peak that is not a target for alarm confirmation, i.e. not a target for monitoring, is not displayed as an alarm.

Abnormality Detection Process

Figure 27:
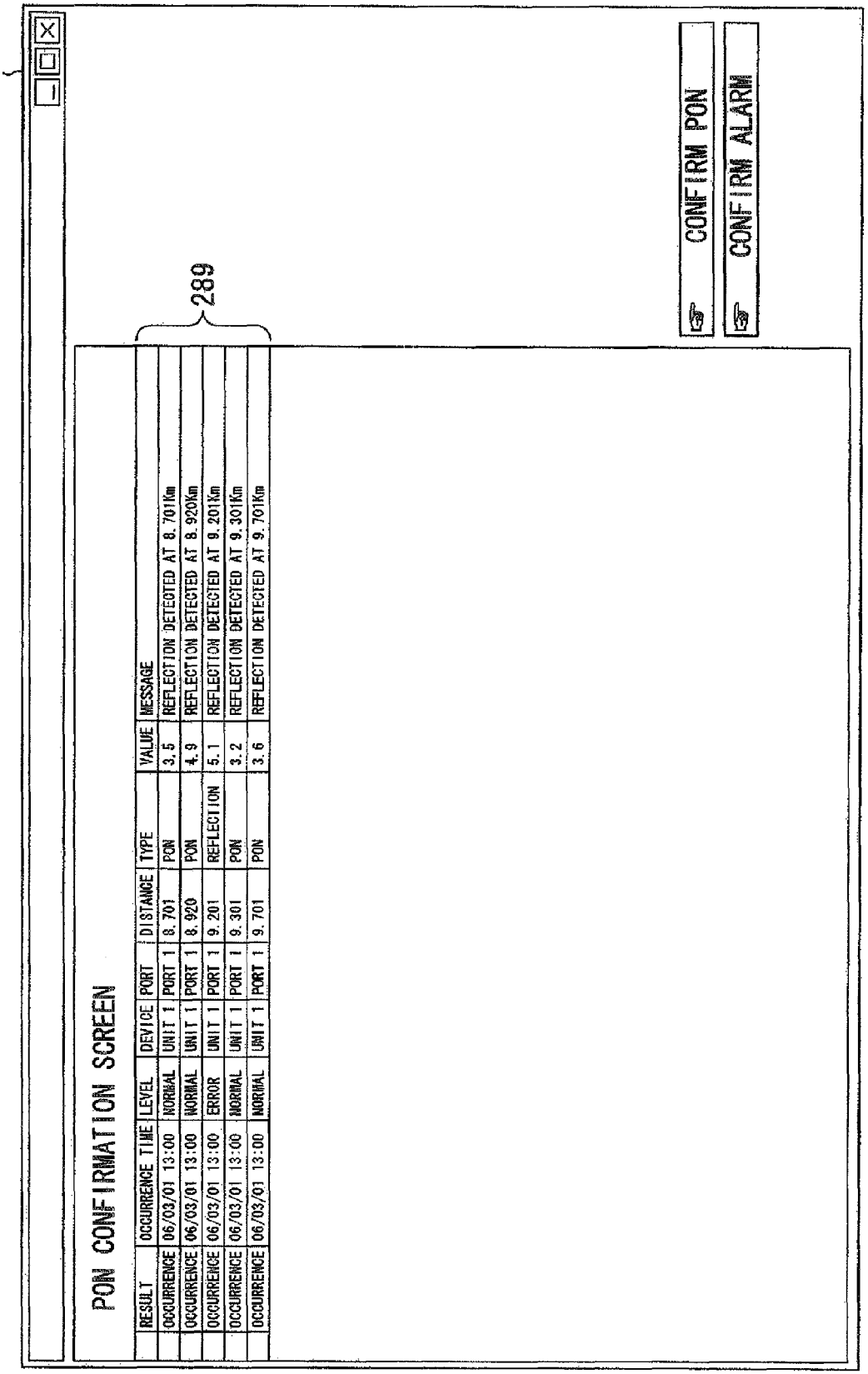
FIG. 27 is a diagram of a PON confirmation screen (part 1) during an abnormality detection process in the second embodiment.
Figure 28:
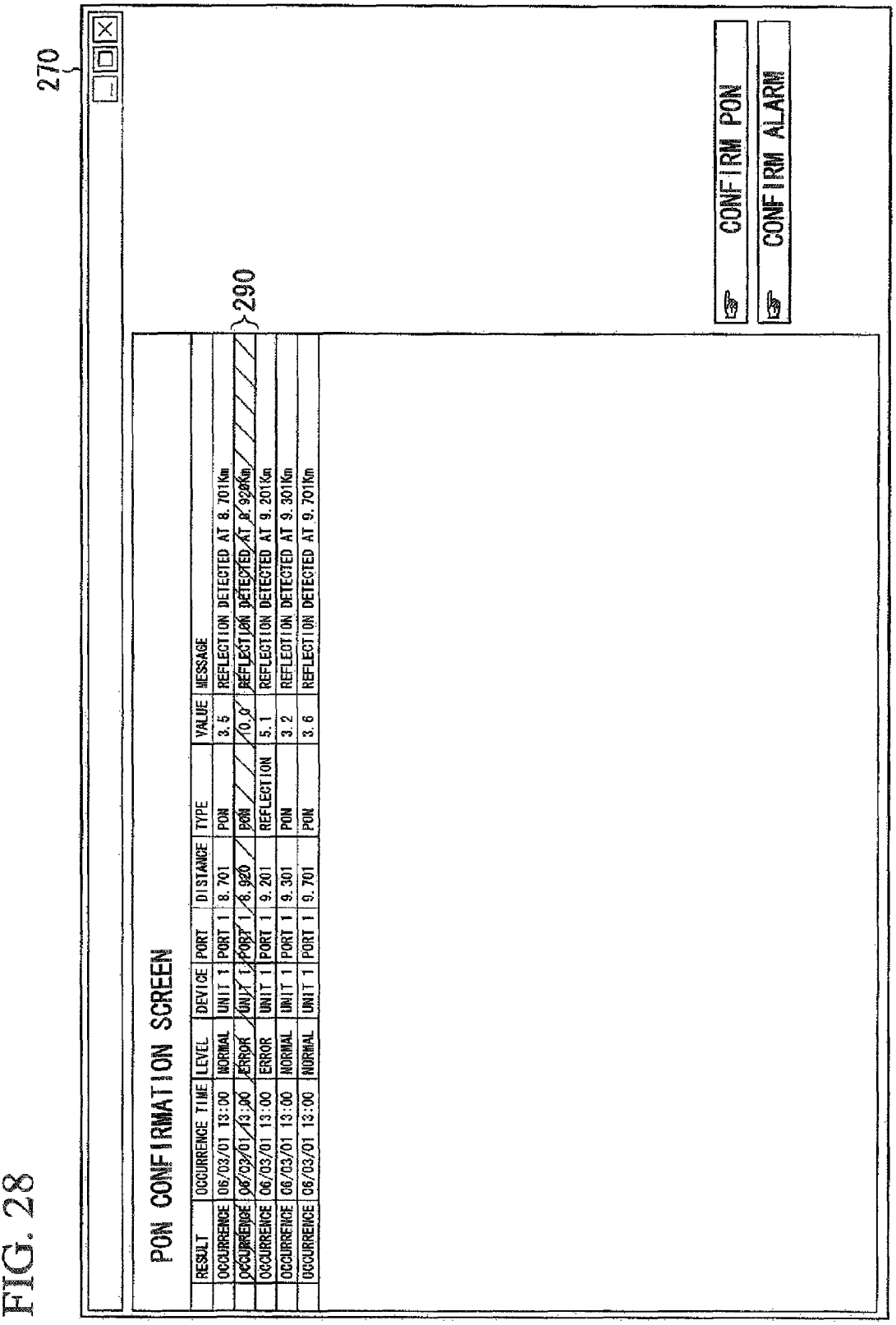
FIG. 28 is a diagram of a PON confirmation screen (part 2) during an abnormality detection process in the second embodiment.

Next, an abnormality detection process of the optical transmission line monitoring device 1a according to the second embodiment will be explained with reference to FIGS. 27 and 28. FIGS. 27 and 28 are diagrams of display steps of displaying display data in a display color indicating an alarm when the reflection attenuation amount increases at a peak for which a PON confirmation has been made. FIG. 27 is a diagram of the state where a PON confirmation or an alarm confirmation has been made in all display data 289, in which the display data 289 is displayed in a display color other than one indicating an alarm. At this time, when new measurement data is output from the measuring device 40, the detection processing unit 24 creates new detection data for each peak in the region identified by the frame display unit 23.

When creating new detection data, the detection processing unit 24 determines whether detection data corresponding to the new detection data is already stored in the detection data storage unit 16. The determination of whether the new detection data is identical to detection data that is already stored is made by determining whether 'Line data', 'Type', and 'Distance' in the detection data storage unit 16 match.

When detection data that matches the new detection data is already stored in the detection data storage unit 16, the detection processing unit 24 uses the 'Ack' entry of the detection data, i.e. the reflection attenuation amount, as a reference in determining whether the reflection attenuation amount of the new detection data has increased. If it has increased, the detection processing unit 24 stores the reflection attenuation amount of the new detection data in the 'Value' entry of the detection data storage unit 16 that matches the new detection data, rewrites the 'Ack' entry to 'Not Yet', and notifies the alarm output unit 13a that new detection data has been stored.

When the alarm output unit 13a receives notification from the detection processing unit 24 that new detection data has been stored, it searches the detection data storage unit 16 and, if it detected detection data whose 'Ack' entry is 'Not Yet', as shown in FIG. 28, displays display data 290 corresponding to the detected detection data in a display color indicating an alarm, and transmits a start command to the notification device 33. This enables the user to be informed that the reflection attenuation amount has increased and an abnormality has occurred. When the reflection attenuation amount decreases, since no abnormality is indicated, the reflection attenuation amount of the newly created detection data is written in the 'Value' entry of the corresponding to detection data, and the process ends.

Process when Adding Device

Figure 29:
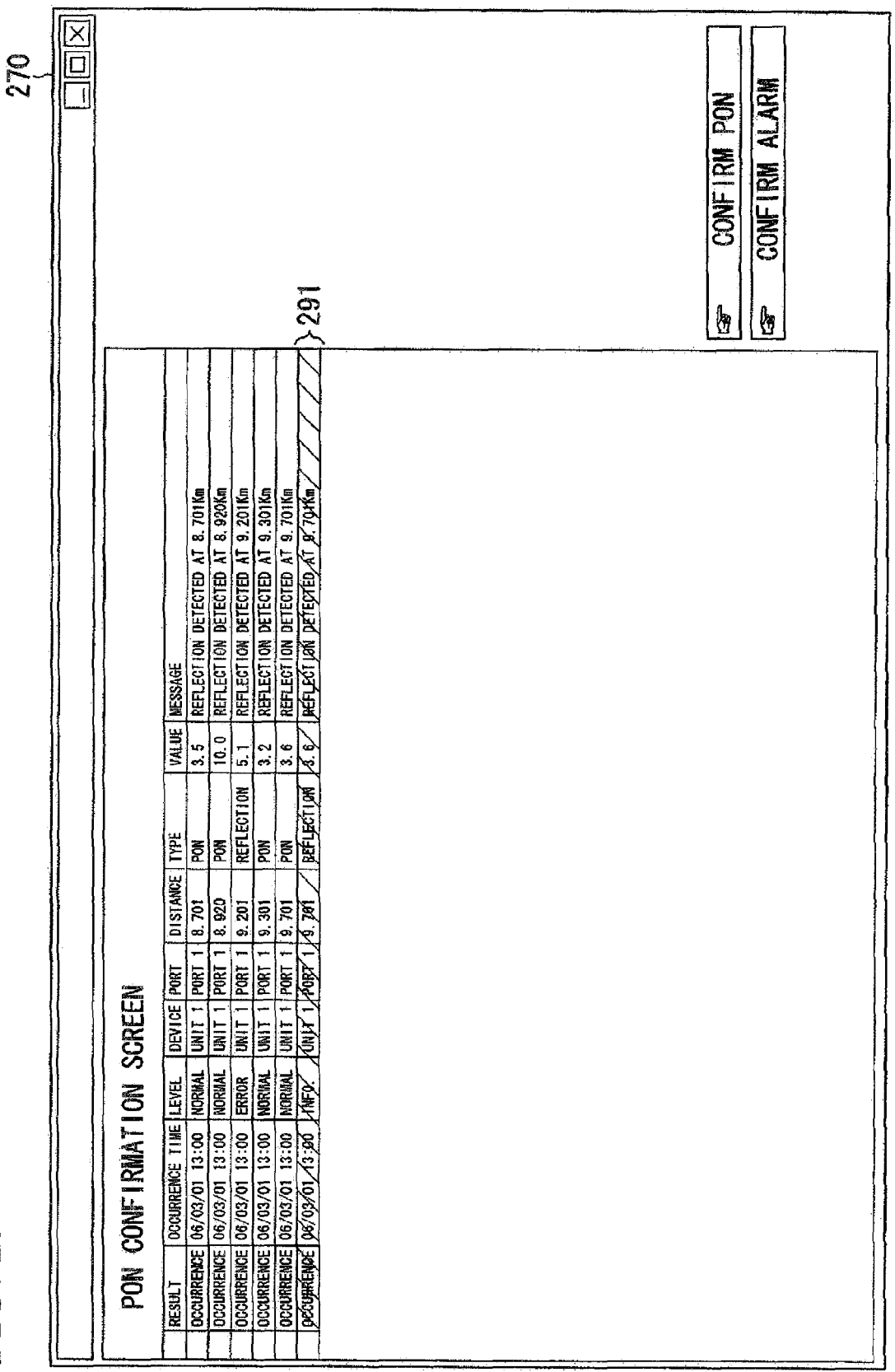
FIG. 29 is a diagram of a PON confirmation screen when adding a device in the second embodiment.

Next, FIG. 29 is a diagram of an operation of the optical transmission line monitoring device 1a when the detection processing unit 24 creates new detection data based on peaks in the region identified by the frame display unit 23, and the detection data storage unit 16 does not contain any detection data matching the new detection data.

When the detection data storage unit 16 does not contain any detection data matching the new detection data, the detection processing unit 24 deems that the newly created detection data does not indicate an abnormality, and that one terminating device has been added. The detection processing unit 24 therefore stores 'Data' in the 'Status' entry of the created detection data, stores 'Not Yet' in the 'Ack' entry, and notifies the alarm output unit 13a that new detection data has been stored. When the alarm output unit 13a receives notification that new detection data has been stored from the detection processing unit 24, it searches the detection data storage unit 16, detects detection data for which display data is not created, creates display data for the detection data, and displays it on the PON confirmation screen 270 as display data 291 shown in FIG. 29. At this time, 'Data' stored in the 'Status' entry of the detection data is displayed in the 'Level' entry of the display data 291.

Similarly in the optical transmission line monitoring device 1a according to the second embodiment, the device data managing device 80 and the map data managing device 90 can be used in checking device locations of terminating devices 165-1 to 165-N where irregularities occur. This makes it possible to limit the range of the device of optical fibers where failures occur, and to identify the failure positions. The failure positions can also be displayed in map data, enabling the user to easily ascertain the geographical locations of failures.

According to the configuration of the second embodiment, a PON system optical transmission line can be monitored without pre-registering device data and initial measurement data. Moreover, peaks caused by reflection from the terminating devices 165-1 to 165-N that are not irregularities can be prevented, by a manipulation performed the user, from being displayed in a display color indicating an alarm. Also, irregularities that do not require failure repair can be prevented, by a manipulation performed by the user, from being displayed in a display color indicating an alarm. Therefore, data displayed as an alarm can be restricted to irregular data requiring failure repair, making it easier for the user to identify irregularities.

With regard to detection data for which the user has made a PON confirmation or an alarm confirmation, when the reflection attenuation amount increases, or when the number of peaks decreases, this detection data is displayed again in a display color indicting an alarm, thereby enabling status changes on the optical transmission line to be monitored.

When a reflection peak is newly generated, it is displayed as an addition to the terminating devices 165-1 to 165-N. This configuration makes it easy for the user to differentiate between peaks caused by irregularities and reflection peaks generated by addition of a device.

Third Embodiment

Next, a third embodiment of the invention will be explained. As with the optical transmission line monitoring device 1a shown in FIG. 19, the third embodiment relates to a PON system optical transmission line, the configuration being the same as the optical transmission line monitoring device 1a of the second embodiment with the exception of the configurations of the alarm output unit 13a and the exclusion data processing unit 12a. An alarm output unit of the third embodiment is represented by reference numeral 13b, a exclusion data processing unit by reference numeral 12b, and an optical transmission line monitoring device by reference numeral 1b.

Figure 30:
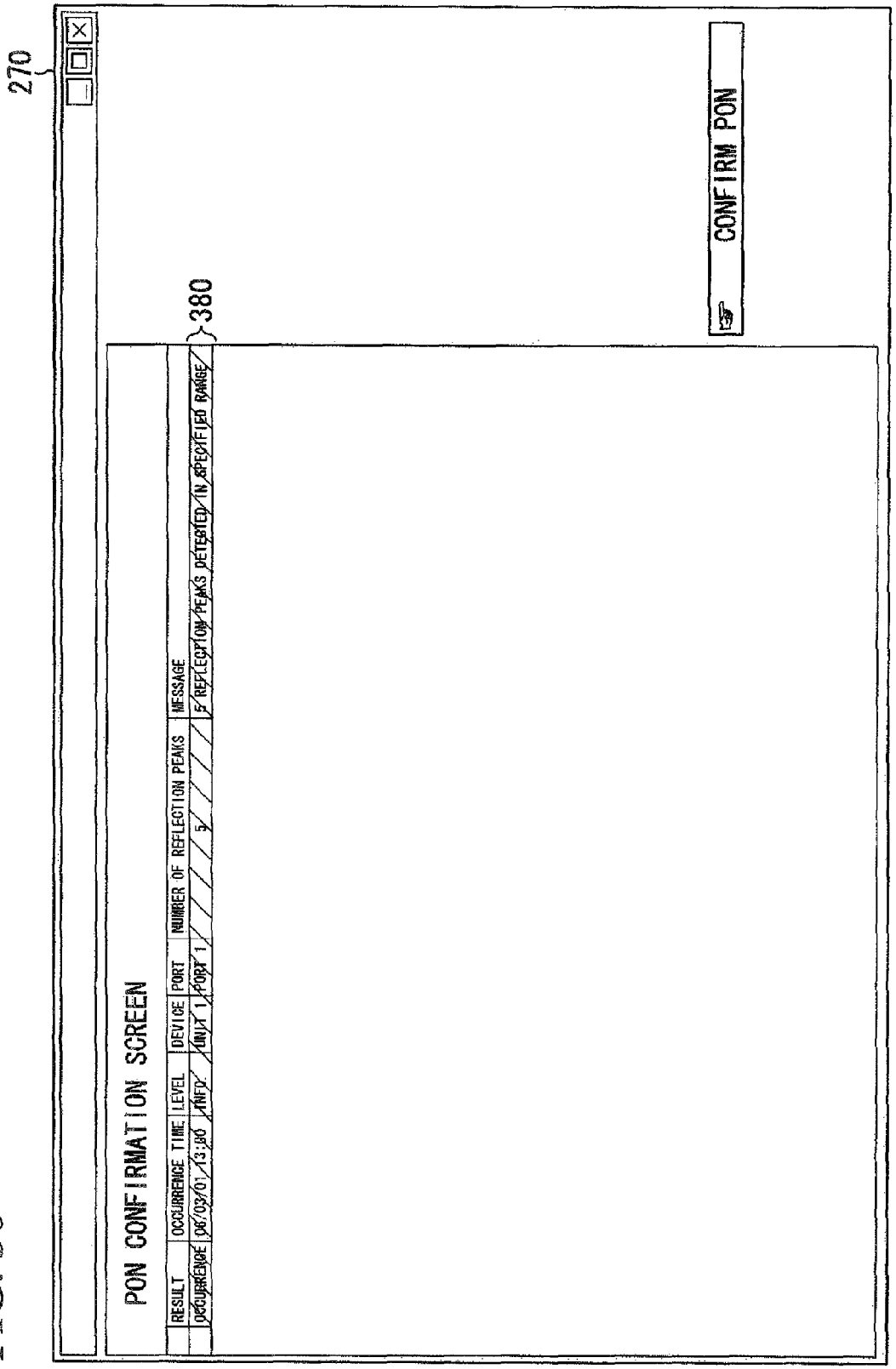
FIG. 30 is a diagram of a PON confirmation screen (part 1) during PON confirmation process in a third embodiment.

When the alarm output unit 13b according to the third embodiment creates display data for outputting to the screen based on detection data stored in the detection data storage unit 16, instead of creating display data based on each piece of detection data, it creates display data containing the number of pieces of detection data. The alarm output unit 13b also transmits, to the exclusion data processing unit 12b, data indicating a correlative relationship between the display data and the original detection data from which the display data was created. As shown specifically in FIG. 30, it creates display data 380 having an entry for 'Number of Reflection Peaks', and outputs this to a PON confirmation screen 370. In FIG. 30, the display data 380 is based on detection data first created by the detection processing unit 24, and, since 'Not Yet' is stored in the 'Ack' entries of all the detection data, it is displayed in a display color indicating an alarm.

When the exclusion data processing unit 12b receives the data indicating the correlative relationship between the display data and the detection data from the alarm output unit 13b, it stores this data in an internal storage region. When a PON confirmation operation (described below) is performed to the display data, based on the internally stored data indicating the correlative relationship, the exclusion data processing unit 12b writes 'OK' in the 'Ack' entry of the detection data of the detection data storage unit 16 corresponding to the display data, and notifies the alarm output unit 13b that the detection data has been changed. An operation of the optical transmission line monitoring device 1b according to the third embodiment will be explained below.

PON Confirmation Operation

Figure 31:
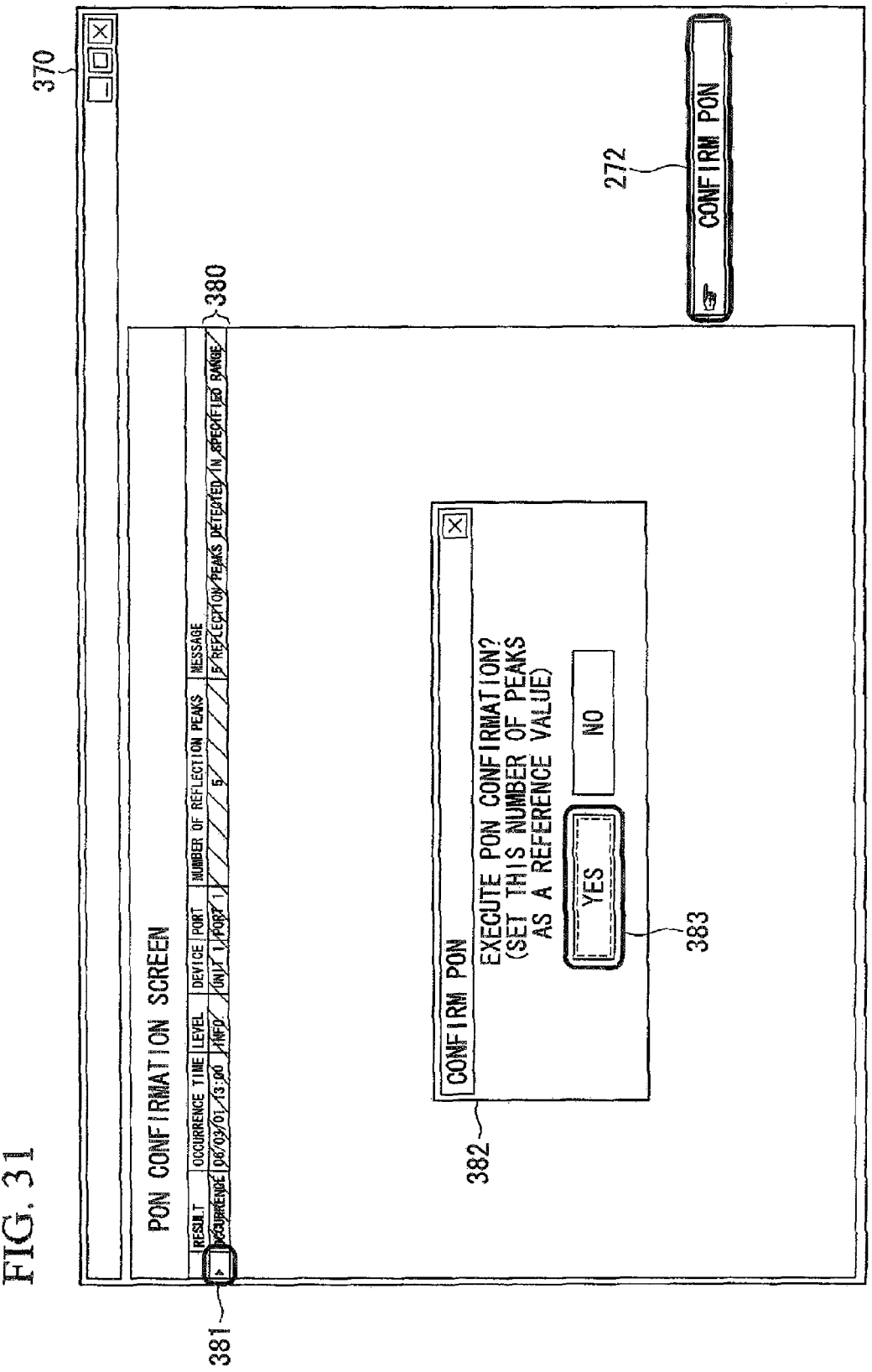
FIG. 31 is a diagram of a PON confirmation screen (part 2) during PON confirmation process in the third embodiment.

FIG. 31 is a diagram of steps of a PON confirmation operation in the PON confirmation screen 370. The PON confirmation operation in the third embodiment is performed when a user confirms that all the peaks displayed by the number in 'Number of Reflection Peaks' are generated by the terminating devices 165-1 to 165-N. Specifically, the user manipulates the mouse 31 on the PON confirmation screen 370 such as to select a row (reference numeral 381) indicating the display data 380 for PON confirmation. The user then selects a PON confirmation button 372, and selects a 'Yes' button 383 in a small window that is thereby displayed.

The exclusion data processing unit 12b receives this selection, reads data of the selected row from an internal storage region, and reads display data indicating a correlative relationship between the display data corresponding to data of the read row and the detection data. The exclusion data processing unit 12b then writes 'OK' in the 'Ack' entry of the detection data storage unit 16 corresponding to the read detection data, and notifies the alarm output unit 13b that the detection data has been changed.

Figure 32:
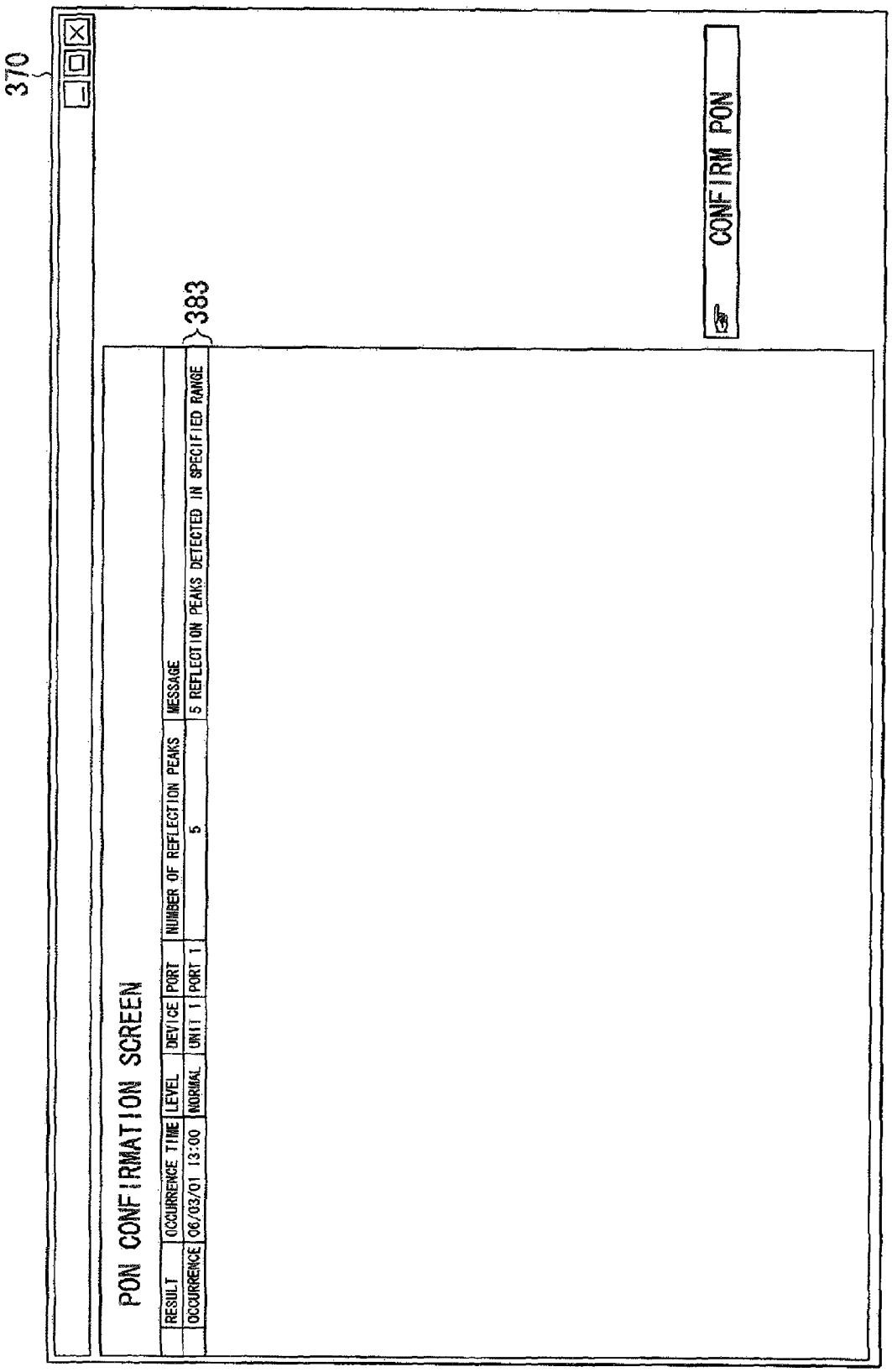
FIG. 32 is a diagram of a PON confirmation screen (part 3) during PON confirmation process in the third embodiment.

The notified alarm output unit 13b retrieves detection data stored in the detection data storage unit 16, and retrieves the 'Ack' entry. The alarm output unit 13b displays display data corresponding to detection data whose 'Ack' entry is 'Not Yet' in a display color indicating an alarm, and displays display data corresponding to detection data whose 'Ack' entry is 'OK' in a display color other than one indicating an alarm. Thus in the display data 380 shown in FIG. 31 is displayed as the display data 383 in a display color other than a color indicating an alarm as shown in FIG. 32.

Abnormality Detection Process

Figure 33:
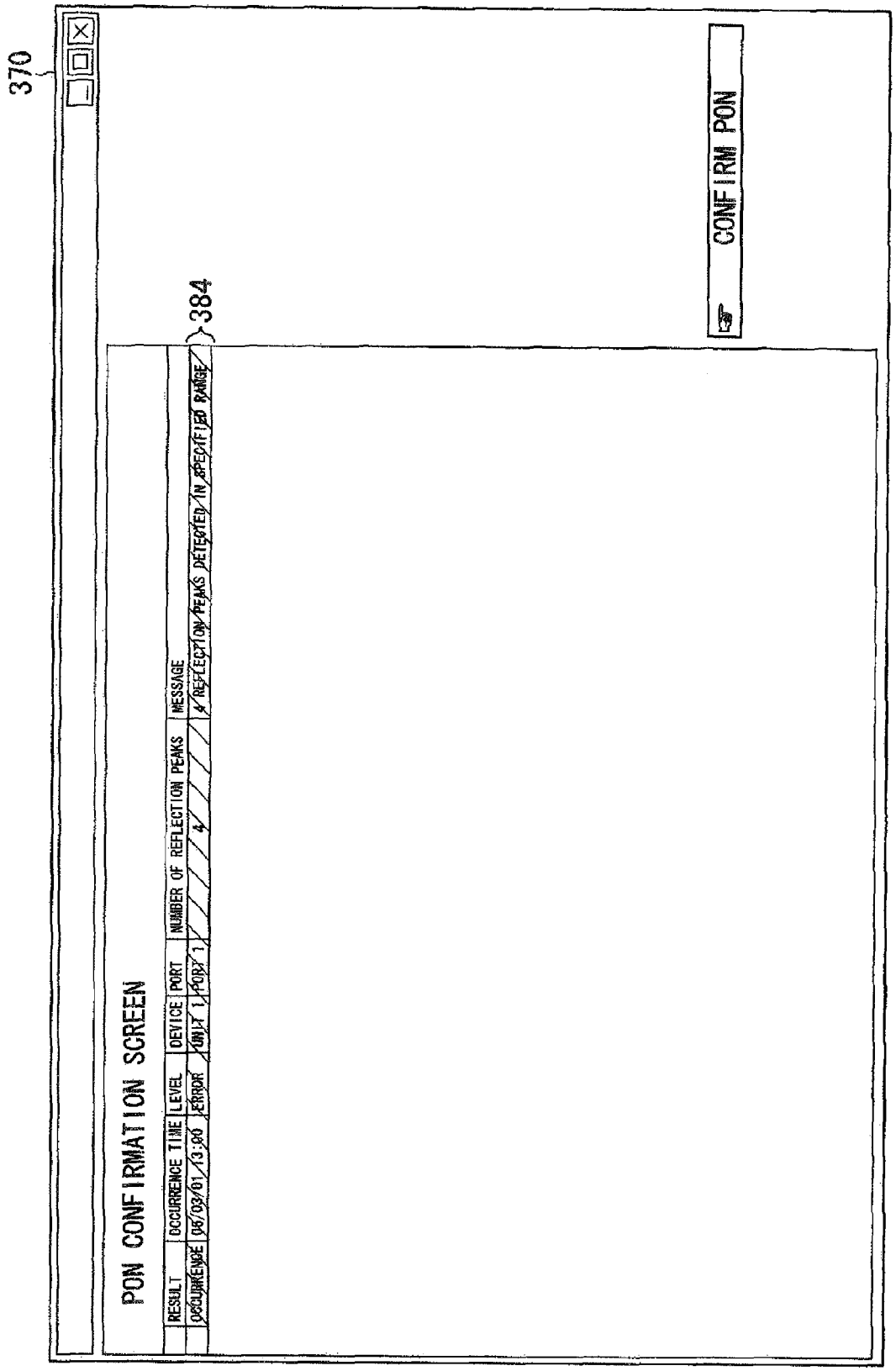
FIG. 33 is a diagram of a PON confirmation screen during an abnormality detection process in the third embodiment.

Next, an operation for detecting abnormality of the optical (transmission line monitoring device 1b according to the third embodiment will be explained. In the third embodiment, a decrease in the number of peaks is detected as an abnormality. FIG. 33 is a diagram of a display state of the PON confirmation screen 370 when, after performing the PON confirmation shown in FIG. 32, the number of peaks in the region identified by the frame display unit 23 decreases. When new measurement data is input to the detection processing unit 24 from the measuring device 40, the detection processing unit 24 creates a new piece of detection data for each peak in the region identified by the frame display unit 23. The detection processing unit 24 then counts the number of pieces of newly created detection data, and, using the number of pieces of detection data already stored in the detection data storage unit 16 or the number of pieces of display data displayed on the screen 32 as a reference, determines whether the number of pieces of newly created detection data has decreased.

If the defection processing unit 24 determines that the number has decreased, it deems that an abnormality has occurred. Accordingly, the detection processing unit 24 deletes the detection data stored in the detection data storage unit 16, rewrites it to the newly created detection data, and changes the 'Ack' entry to 'Not Yet.' When the numbers match, the detection processing unit 24 rewrites each piece of detection data stored in the detection data storage unit 16 to the contents of the new detection data corresponding to the stored detection data. The detection processing unit 24 then notifies the alarm output unit 13b that new detection data has been stored. The notified alarm output unit 13b counts the number of pieces of detection data in the detection data storage unit 16 whose 'Ack' entry is 'Not Yet', and creates display data 384, which it displays in a color indicating an alarm as shown in FIG. 33. Thus the user can learn, from the decrease in the number of peaks, that an abnormality has occurred.

When the number of peaks increases, i.e. when the number of newly created pieces of detection data increases, the detection processing unit 24 stores the increased detection data in the detection data storage unit 16, creates display data based on the increased detection data, and displays this display data on the PON confirmation screen 370, together with data indicating that a new terminating device has been added.

While in the third embodiment, as in the second embodiment, detection data of each peak is stored in the detection data storage unit 16, and the number of pieces of detection data is counted by the alarm output unit 13b in creating display data, this is not limitative of the invention. The configuration need only be such that the number of peaks is counted, and displayed on the PON confirmation screen 270. For example, instead of creating detection data for each peak, the detection processing unit 24 can create one row of detection data constituted by entries of the display data 380 shown in FIG. 30, based on data relating to a plurality of peaks in the region identified by the frame display unit 23, and store this display data in the detection data storage unit 16. The alarm output unit 13b can now create display data based on the stored detection data and display it on the PON confirmation screen 370, without needing to count the number of pieces of detection data in the detection data storage unit 16.

According to the configuration of the third embodiment, a PON system optical transmission line can be monitored without pre-registering device data and initial measurement data. Moreover, peaks caused by reflection from the terminating devices 165-1 to 165-N that are not irregularities can be prevented, by a manipulation performed the user, from being displayed in a display color indicating an alarm. Also, irregularities that do not require failure repair can be prevented, by a manipulation performed by the user, from being displayed in a display color indicating an alarm. Therefore, data displayed as an alarm can be restricted to irregular data requiring failure repair, making it easier for the user to identify irregularities.

Note that, in the second embodiment, data relating to the peaks analyzed by the peak detector 22 is not limited to reflection attenuation amount, and can be loss amount instead.

While in the second and the third embodiments, the detection processing unit 24 detects peaks in a region identified by the frame display unit 23, this is not limitative of the invention; instead, it can detect all peaks above a predetermined optical intensity threshold.

Reference data storage device of the invention corresponds to the reference data storage unit 15, the detecting device corresponds to the detecting unit 11, and the alarm outputting device corresponds to the alarm output units 13, 13a, and 13b. The inputting device and the coordinate data inputting device correspond to the input unit 14, the removal data adding device corresponds to the exclusion data processing units 12, 12a, and 12b, and the detection data storage device corresponds to the detection data storage unit 16. The notifying device corresponds to the notification device 33. The first connecting device and the second connecting device correspond to the connection unit 10. The device data displaying device corresponds to the device data display unit 17. The positional data storage device corresponds to the positional data storage unit 20, and the positional data displaying device corresponds to the positional data display unit 18. The waveform displaying device corresponds to the waveform display unit 21, the peak detecting device corresponds to the peak detector 22, the frame displaying device corresponds to the frame display unit 23, and the detection processing device corresponds to the detection processing unit 24.

Each of the optical transmission line monitoring devices 1, 1a, and 1b includes an internal computer system. Steps of an alarm determination process, a process of the exclusion data processing unit when it receives an alarm confirmation from a user, a coordinated process of the device data managing device and the map data managing device, the PON confirmation process, an alarm confirmation manipulation, an abnormality detection process, and a process when adding a device are stored in program format in a computer-readable recording medium, and are performed by making a computer read and execute that program. A computer-readable recording medium here refers to a magnetic disk, an optical magnetic disk, a CD-ROM, a DVD-ROM, a semiconductor memory, and so on. The computer program can also be delivered via a communication line to the computer, which receives and executes the program.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical transmission line monitoring device comprising:
   a device which calculates a management amount based on an optical intensity of returning light;
   a reference data storage device which stores reference management amounts beforehand;
   a detecting device which in response to the calculated management amount being of poorer quality than the reference management amount stored in the reference data storage device detects a distance, creates detection data based on the calculated management amount, and stores the created detection data in a detection data storage device;
   an alarm outputting device that creates alarm data based on the detection data created by the detecting device, and displays the created alarm data on a screen;
   an inputting device that inputs selection command data indicating that the alarm data displayed on the screen will not be output; and
   a removal data adding device that adds, to the detection data stored in the detection data storage device corresponding to the alarm data of the selection command data input by the inputting device, output removal data indicating that it is not a target for outputting by the alarm outputting device; wherein
   the alarm outputting device changes a display of the alarm data corresponding to the detection data that the removal data adding device adds the output removal data to.

2. The optical transmission line monitoring device according to claim 1, wherein
   the reference data storage device stores a termination reference management amount;
   the detecting device detects the distance if the calculated management amount is of poorer quality than the termination reference management amount stored in the reference data storage device, creates termination detection data including the detected distance and the calculated management amount, and stores the created termination detection data in the detection data storage device; and
   the alarm outputting device creates, based on the termination detection data created by the detecting device, a first alarm data containing data indicating that it is a candidate for termination, and displays the first alarm data on the screen.

3. The optical transmission line monitoring device according to claim 2, wherein
the inputting device inputs a first selection command data indicating that the first alarm data is selected as data corresponding to a termination;
the removal data adding device adds output removal data to the detection data stored in the detection data storage device corresponding to the first alarm data in response to the first selection command data input by the inputting device; and
the alarm outputting device deletes the display of the first alarm data in response to the removal data adding device adding the output removal data to the detection data stored in the detection data storage device corresponding to the first alarm data.

4. The optical transmission line monitoring device according to claim 3, wherein the calculated management amount is a loss amount or a return loss amount;
the reference data storage device stores a termination reference loss amount or a termination reference return loss amount as the termination reference management amount; and
the detecting device detects the distance only if the loss amount exceeds the termination reference loss amount stored in the reference data storage device and the return loss amount is below the termination reference return loss amount stored in the reference data storage device, creates termination detection data containing the detected distance and the loss amount, or the return loss amount, and stores the created detection data in the detection data storage device.

5. The optical transmission line monitoring device according to claim 1, further comprising a notifying device that notifies a warning; and wherein
the alarm outputting device displays the alarm data on the screen, and notifies the alarm to the notifying device;
the alarm outputting device makes the notifying device stop notification of the alarm in response to the output removal data being added to the detection data.

6. The optical transmission line monitoring device according to claim 1, wherein
the reference data storage device further stores a redetection reference management amount;
the detecting device, calculates a difference between a first management amount corresponding to the detected distance that exists already in the detection data storage device and the calculated management amount contained in the detection data, and stores the calculated management amount in place of the first management amount if the calculated difference is of poorer quality than the redetection reference management amount and if a first output removal data was previously added to a detection data corresponding to the first management amount, and deletes the first output removal data;
and the alarm outputting device creates alarm data corresponding to the detection data from which the detecting device deleted the output removal data and stored the calculated management amount in, and displays the created alarm data on the screen.

7. The optical transmission line monitoring device according to claim 1, wherein the calculated management amount is a loss amount;
the reference data storage device stores a reference loss amount as the reference management amount; and
the detecting device detects the distance when the loss amount exceeds the reference loss amount stored in the reference data storage device, creates detection data containing the loss amount and the distance at the time of detection, and stores the created detection data in the detection data storage device.

8. The optical transmission line monitoring device according to claim 1, wherein the calculated management amount is a return loss amount;
the reference data storage device stores a reference return loss amount as the reference management amount; and
the detecting device detects the distance when the return loss amount is below the reference return loss amount stored in the reference data storage device, creates detection data containing the return loss amount and the distance at the time of detection, and stores the created detection data in the detection data storage device.

9. The optical transmission line monitoring device according to claim 1, further comprising:
a first connecting device connected to a device data managing device that stores device data of the optical transmission line in an internal storage region; and
a device data display device that receives the device data from the device data managing device via the first connecting device, and, based on the detection data stored in the detection data storage unit and the received device data, extracts, from the device data, device data corresponding to the detection data, and displays it on a screen.

10. The optical transmission line monitoring device according to claim 1, further comprising:
a positional data storage device that stores beforehand positional data corresponding to the distance of each detection data on the optical transmission line; and
a positional data display device that reads positional data corresponding to a distance contained in the alarm data from the positional data storage device, transmits the read positional data to a map data managing device, receives map data displaying a location corresponding to the positional data from the map data managing device, and displays the received map data on a screen.

11. The optical transmission line monitoring device according to claim 1, wherein the alarm outputting device changes a display of the alarm data by changing a color of the alarm data displayed on the screen or by deleting the alarm data displayed on the screen.

12. An optical transmission line monitoring method in an optical transmission line monitoring device comprising: calculating a management amount based on an optical intensity of a returned light;
storing a reference management amount beforehand;
detecting a distance in response to the calculated management amount being of poorer quality than the reference management amount;
creating detection data containing the calculated management amount,
storing the created detection data; creating alarm data based on the detection data created by the detecting device, and displaying the created alarm data on a screen;
receiving a selection command data that indicates that the alarm data displayed on the screen is selected as alarm data that will not be output;
adding to the stored detection data corresponding to the alarm data of the input selection command data, output removal data indicating that it is not a target for out; and
changing a display of the alarm data corresponding to the detection data that the output removal data is added to, such that it can be distinguished from other alarm data.

13. A computer program stored on a computer-readable medium in a computer installed in an optical transmission line monitoring device, the computer program making the computer execute a method of monitoring an optical transmission line, said method comprising:

calculating a management amount based on an optical intensity of a returned light;

storing a reference management amount beforehand;

detecting a distance in response to the calculated management amount being of poorer quality than the reference management amount;

creating detection data containing the calculated management amount;

storing the created detection data;

creating alarm data based on the detection data created by the detecting device, and displaying the created alarm data on a screen;

receiving a selection command data that indicates that the alarm data displayed on the screen is selected as alarm data that will not be output;

adding to the stored detection data corresponding to the alarm data of the input selection command data, output removal data indicating that it is not a target for out; and changing a display of the alarm data corresponding to the detection data that the output removal data is added to, such that it can be distinguished from other alarm data.

14. An optical transmission line monitoring device for monitoring an optical transmission line comprising:

a waveform display device which receives data correlating optical intensity of returning light and distance from a measuring device, and displays a waveform based on the received optical intensity and the distance;

a peak detecting device which detects a peak in the waveform displayed by the waveform display device, creates detection data based on data relating to the detected waveform peak, and stores the created detection data in a detection data storage device;

an alarm outputting device which creates display data based on the detection data stored in the detection data storage device, and outputs the created display data as an alarm to a screen;

an inputting device which inputs selection command data that indicates that the display data displayed on the screen is selected as display data that will not be output as an alarm; and a removal data adding device which adds, to the detection data identified by the selection command data input by the inputting device, output removal data indicating that it is detection data that is not a target for outputting as an alarm; wherein the alarm outputting device does not display data, corresponding to the detection data that the removal data adding device adds the output removal data to, as an alarm.

15. The optical transmission line monitoring device according to claim 14, wherein the peak detecting device comprises:

a frame display device which displays on the screen a frame in a region based on the coordinate data input by a coordinate data inputting device; and a detection processing device which detects a peak of the waveform in the waveform contained in the frame displayed by the frame display device, creates detection data based on data relating to the detected peak of the waveform, and stores the created detection data in a detection data storage device.

16. The optical transmission line monitoring device according to claim 14, wherein the detection data created by the peak detecting device includes a return loss amount at the peak; and the peak detecting device creates new detection data in response to a change in the return loss amount of the detection data of the peak to which the output removal data was added to, by deleting the output removal data of the detection data whose return loss amount has changed, and the peak detection unit stores the new detection data in the detection data storage device; and the alarm outputting device outputs display data, corresponding to the new detection data as an alarm.

17. The optical transmission line monitoring device according to claim 14, wherein the alarm outputting device, based on detection data created by the peak detecting device, creates display data containing data indicating a first number of peaks, and outputs the created display data to a screen, and, creates new display data containing a second number of peaks, and outputs the newly created display data to the screen in response to the peak detecting device creating new detection data having a second number of peaks that is different from the first number of peaks.

18. The optical transmission line monitoring device according to claim 14, wherein the peak detecting device creates new detection data and determines if the new detection data matches a detection data already stored in the detection data storage device, and the alarm outputting device outputs the newly created detection data together with data indicating that it is detection data of a newly added device in response to the peak detection device detecting that the new detection does not match with the detection data already stored in the detection data storage device.

19. The optical transmission line monitoring device according to claim 14, comprising:

a first connecting device connected to a device data managing device that stores device data of the optical transmission line in an internal storage region; and a device data display device that receives the device data from the device data managing device via the first connecting device, and, based on the detection data stored in the detection data storage unit and the received device data, extracts, from the device data, device data corresponding to the detection data, and displays it on a screen.

20. The optical transmission line monitoring device according to claim 14, wherein the optical transmission line is a passive optical network (PON) system optical transmission line.

21. An optical transmission line monitoring method comprising:

receiving data correlating optical intensity of returning light and distance from a measuring device;

displaying a waveform based on the received optical intensity and distance;

detecting a peak in the displayed waveform;

creating detection data based on data relating to the detected waveform peak, storing the created detection data in a detection data storage device;

creating display data based on the detection data stored in the detection data storage device;

outputting the created display data as an alarm to a screen;

inputting selection command data that indicates that the display data displayed on the screen is selected as display data that will not be output as an alarm;

adding to the detection data identified by the input selection command data, output removal data indicating that it is detection data that is not a target for outputting as an alarm, and storing the detection data to which the output removal data has been added in the detection data storage device; and not displaying display data, corresponding to the detection data that the output removal data is added to, as an alarm.

22. A computer program stored on a computer-readable storage medium for a computer of an optical transmission line monitoring device, the computer program making the computer execute a method of monitoring an optical transmission line, said method comprising:

receiving data correlating optical intensity of returning light and distance from a measuring device;

displaying a waveform based on the received optical intensity and distance;

detecting a peak in the displayed waveform;

creating detection data based on data relating to the detected waveform peak;

storing the created detection data in a detection data storage device;

creating display data based on the detection data stored in the detection data storage device;

outputting the created display data as an alarm to a screen;

inputting selection command data that indicates that the display data displayed on the screen is selected as display data that will not be output as an alarm;

adding to the detection data identified by the input selection command data, output removal data indicating that it is detection data that is not a target for outputting as an alarm, and storing the detection data to which the output removal data has been added in the detection data storage device; and not displaying display data, corresponding to the detection data that the output removal data is added to, as an alarm.

* * * * *